United States Patent [19]
McKay et al.

[11] Patent Number: 6,035,786
[45] Date of Patent: Mar. 14, 2000

[54] MINIATURE PIPE CRAWLER TRACTOR

[75] Inventors: Mark D. McKay; Matthew O. Anderson, both of Idaho Falls, Id.; Todd A. Ferrante, Westerville, Ohio; W. David Willis, Idaho Falls, Id.

[73] Assignee: Bechtel BWXT Idaho, LLC, Idaho Falls, Id.

[21] Appl. No.: 08/956,259

[22] Filed: Oct. 22, 1997

[51] Int. Cl.$^7$ .................................................. B61B 13/10
[52] U.S. Cl. ................................... 104/138.1; 104/138.2; 105/365
[58] Field of Search ............................. 104/138.1, 138.2; 105/365

[56] References Cited

U.S. PATENT DOCUMENTS

| | | | |
|---|---|---|---|
| 3,224,734 | 12/1965 | Hill | 254/134.6 |
| 4,372,161 | 2/1983 | de Buda et al. | 73/432 R |
| 5,203,646 | 4/1993 | Landsberger et al. | 104/138.2 |
| 5,371,363 | 12/1994 | Lilimpakis | 104/138.2 |
| 5,423,230 | 6/1995 | Olander et al. | 73/865.8 |

*Primary Examiner*—Mark T. Le
*Assistant Examiner*—Robert J McCarry, Jr.
*Attorney, Agent, or Firm*—Klaas Law O'Meara & Malkin

[57] ABSTRACT

A pipe crawler tractor may comprise a half tractor assembly having a first base drive wheel, a second base drive wheel, and a top drive wheel. The drive wheels are mounted in spaced-apart relation so that the top drive wheel is positioned between the first and second base drive wheels. The mounting arrangement is also such that the first and second base drive wheels contact the inside surface of the pipe at respective first and second positions and so that the top drive wheel contacts the inside surface of the pipe at a third position, the third position being substantially diametrically opposed to the first and second positions. A control system connected to the half tractor assembly controls the rotation of the first base wheel, the second base wheel, and the top drive wheel to move the half tractor assembly within the pipe.

23 Claims, 14 Drawing Sheets

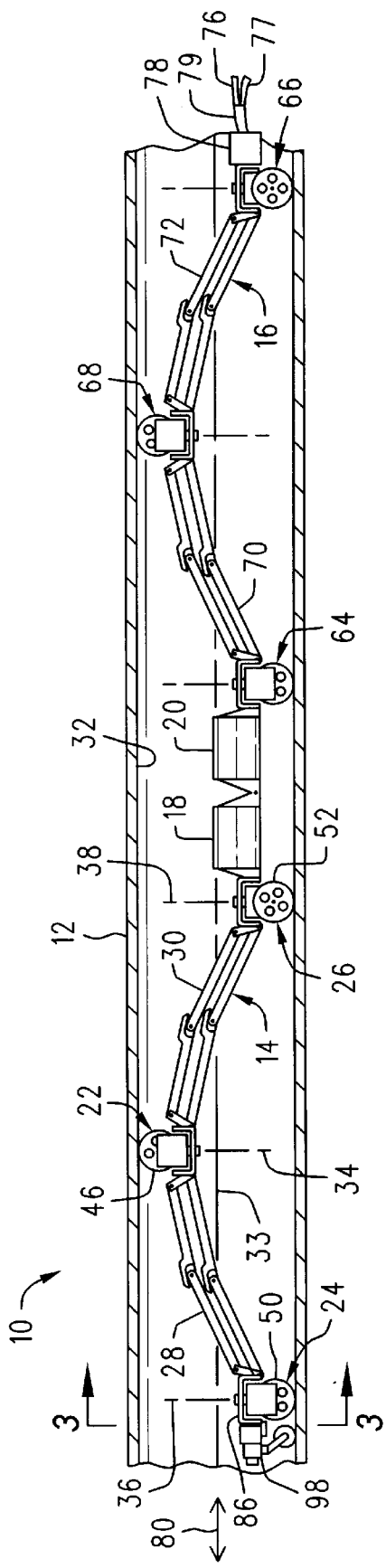
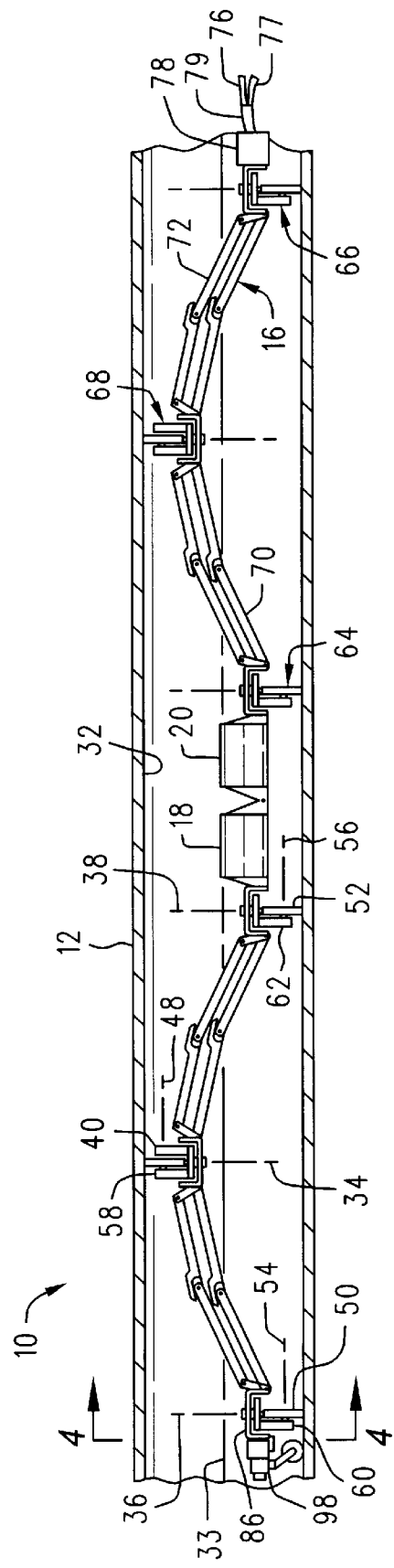

MINIATURE PIPE CRAWLER TRACTOR

CONTRACTUAL ORIGIN OF THE INVENTION

The United States Government has rights in this invention disclosed under contract number DE-AC07-84ID12435 between the U.S. Department of Energy and Westinghouse Idaho Nuclear Company, now contract number DE-AC07-94ID13223 with Lockheed Idaho Technologies Company.

FIELD OF THE INVENTION

This invention relates to robotic devices in general and more specifically to robotic devices for traversing small-diameter piping systems and other channel-like conduit members.

BACKGROUND OF THE INVENTION

Numerous devices have been developed and are being used to traverse piping systems for cleaning, inspection, and or examination of the piping system. For example, such "pipe crawlers" may be equipped with cleaning apparatus suitable for cleaning the inside surfaces of the piping system. Alternatively, the pipe crawler may be fitted with a small camera to allow for visual inspection of the piping system. In still other applications, the pipe crawler may be equipped with sensors to perform any of a wide range of examinations.

One type of pipe crawler design incorporates a plurality of inflatable bladders or sections that are selectively inflated and deflated by a suitable control system. The inflatable sections are designed so that they expand both radially and axially upon inflation. Accordingly, the selective inflation and deflation of the various inflatable bladders causes the pipe crawler to advance or retreat through the pipe section in an inch-worm like fashion. Another type of pipe crawler utilizes a mechanical track drive system to move the pipe crawler through the piping system.

While such pipe crawlers are advantageous in that they allow for the in-situ cleaning, examination, or inspection of piping systems, they are not without their disadvantages. For example, while such pipe crawlers have been used successfully in relatively large-diameter piping systems, it has been difficult to miniaturize the pipe crawlers so that they can be used in smaller diameter piping systems, such as systems having pipes with diameters in the range of 1–3 inches. Even if such pipe crawlers could be miniaturized, problems remain in coming up with a design capable of accommodating different pipe diameters. It has also proven difficult to provide such pipe crawlers with the ability to ascend and descend vertical portions of the piping system. Still other difficulties are associated with guiding the pipe crawler through the various elbow and "tee" joints usually present in every piping system.

Consequently, a need exists for a pipe crawler capable of traversing small-diameter piping systems. Such a pipe crawler should be suitable for use in a piping system having several different diameters and should be capable ascending and descending vertical portions of the piping system. Additional advantages could be realized if the pipe crawler could be selectively navigated through the various "tee" and elbow joints contained in most piping systems.

SUMMARY OF THE INVENTION

A pipe crawler tractor according to the present invention may comprise a half tractor assembly having a first base drive wheel, a second base drive wheel, and a top drive wheel. The drive wheels are mounted in spaced-apart relation so that the top drive wheel is positioned between the first and second base drive wheels. The mounting arrangement is also such that the first and second base drive wheels contact the inside surface of the pipe at respective first and second positions and so that the top drive wheel contacts the inside surface of the pipe at a third position that is substantially diametrically opposed to the first and second positions. A control system connected to the half tractor assembly controls the rotation of the first base drive wheel, the second base drive wheel, and the top drive wheel to move the half tractor assembly within the pipe.

BRIEF DESCRIPTION OF THE DRAWINGS

Illustrative and presently preferred embodiments of the invention are shown in the accompanying drawing in which:

FIG. 1 is a side view in elevation of a pipe crawler tractor according to the present invention positioned within a pipe and with the drive wheels oriented in the crawling position;

FIG. 2 is a side view in elevation of the pipe crawler tractor shown in FIG. 1, but with the drive wheels oriented in the steering position;

DETAILED DESCRIPTION OF THE INVENTION

Figure 3:
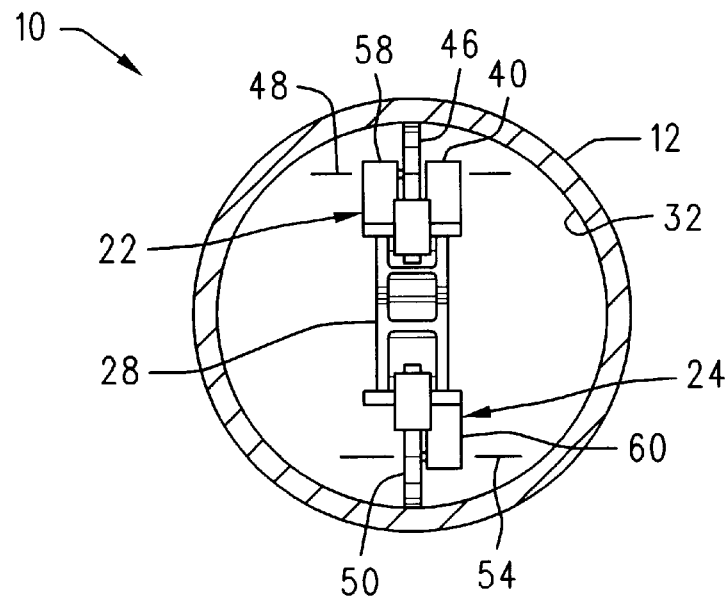
FIG. 3 is a cross-section view in elevation of the pipe crawler tractor taken along the line 3—3 of FIG. 1.

One embodiment of a miniature pipe crawler tractor 10 according to the present invention is shown in FIGS. 1–4 as it may be positioned inside a pipe 12 to be inspected or traversed. The pipe crawler tractor 10 may include a front half tractor assembly 14 and a rear half tractor assembly 16, each of which is essentially identical. The front and rear half tractor assemblies 14 and 16 may be connected together by a pair of payload pods 18 and 20, although they may also be joined directly together, as will be explained in greater detail below.

The front half tractor assembly 14 comprises a top drive wheel assembly 22 and a pair of base drive wheel assemblies 24 and 26 mounted in tandem, spaced-apart relation by a pair of spring-loaded flexible linkage assemblies 28 and 30. More specifically, the front base drive wheel assembly 24 is mounted to the top drive wheel assembly 22 by a first flexible arm or linkage assembly 28. Similarly, the rear base drive wheel assembly 26 is connected to the top drive wheel assembly 22 by a second flexible arm or linkage assembly 30. The first and second flexible arm assemblies 28 and 30 are spring biased so that they urge the top and base drive wheel assemblies 22, 24, and 26, respectively, against the inside wall 32 of pipe 12 to provide traction for the various drive wheels 46, 50, and 52.

The top drive wheel assembly 22 includes a drive wheel 46 mounted for rotation about a top drive axis 48. See FIG. 2. Similarly, the front and rear base drive wheel assemblies 24 and 26 include respective front and rear drive wheels 50 and 52 mounted for rotation about respective front and rear drive axes 54 and 56, as also best seen in FIG. 2. In one preferred embodiment, each drive wheel 46, 50, and 52 is driven by a respective drive motor assembly 58, 60, and 62.

Figure 4:
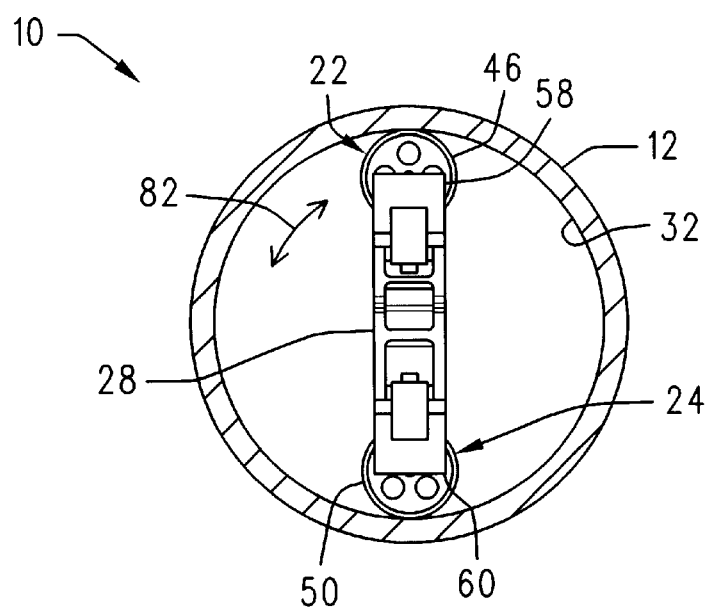
FIG. 4 is a cross-section view in elevation of the pipe crawler tractor taken along the line 4—4 of FIG. 2.

The top drive wheel assembly 22 is pivotally mounted about a top steering axis 34 so that it can be pivoted back and forth between a crawling position (FIGS. 1 and 3) and a steering position (FIGS. 2 and 4). When the top drive wheel assembly 22 is in the crawling position, the top drive wheel 46 is generally parallel to the longitudinal axis 33 of the pipe 12. Conversely, when the top drive wheel assembly 22 is in the steering position, the top drive wheel 46 is generally perpendicular to the longitudinal axis 33 of pipe 12. The front and rear base drive wheel assemblies 24 and 26 are similarly pivotally mounted about respective front and rear steering axes 36 and 38 and also can be pivoted from the crawling position (FIGS. 1 and 3) to the steering position (FIGS. 2 and 4).

In one preferred embodiment, the top drive wheel assembly 22 includes a steering actuator assembly 40 for rotating the top drive wheel assembly 22 about the top steering axis 34. Front and rear flexible drive shafts 42 and 44 (FIG. 6) connected between the top drive wheel assembly 22 and the respective front and rear base drive wheel assemblies 24 and 26 transmit steering torque from the top drive wheel assembly 22 to the front and rear drive wheel assemblies 24, 26, thus causing them to rotate about their respective front and rear steering axes 36 and 38 in a synchronized manner.

The rear half tractor assembly 16 is essentially identical to the front half tractor assembly 14. That is, the rear half tractor assembly 16 includes a front base drive wheel assembly 64, a rear base drive wheel assembly 66, and a top drive wheel assembly 68. The front and rear base drive wheel assemblies 64 and 66 are mounted to the top drive wheel assembly 68 by a front flexible arm 70 and a rear flexible arm 72 in the manner already described for the front half tractor assembly 14. See FIGS. 1 and 2.

The two half tractor assemblies 14 and 16 may be directly connected together or they may be joined together by a payload pod or pods, such as payload pods 18 and 20. The payload pods 18 and 20 may be used to carry sensing devices (not shown) or other equipment desired for or required by the particular task at hand. The payload pods 18 and 20 may also be used to house any electronic circuitry or microprocessor control systems (not shown) that may be required or desired to assist in the control or operation of the various drive motor assemblies (e.g., 58, 60, and 62) and/or the steering motor assembly 40. In one preferred embodiment, a small video camera and light assembly 98 (FIGS. 1 and 2) may be mounted to the carrier 86 of the front base drive wheel assembly 24 to allow the operator to visually inspect the inside of the piping system and align the pipe crawler 10 so that it can be directed through the various turns and joints comprising the piping system.

Figure 16:
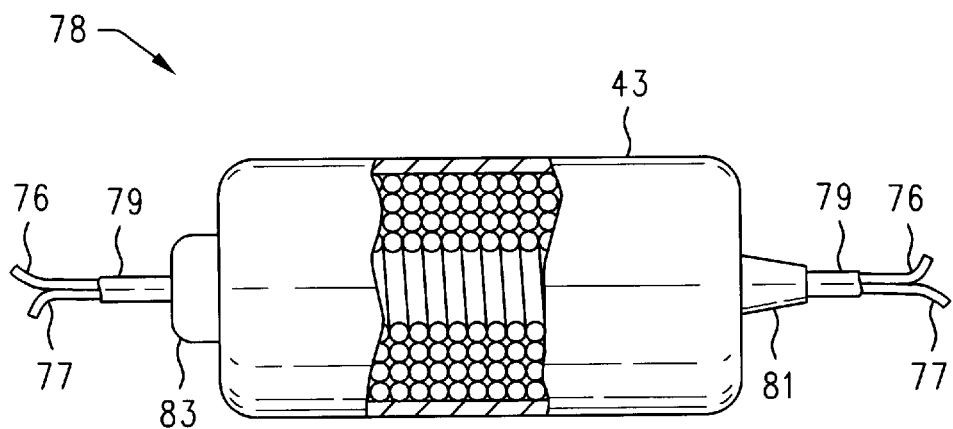
FIG. 16 is a side view in elevation of the tether reel assembly with a portion of the case broken away to show the tether windings contained therein.
Figure 17:
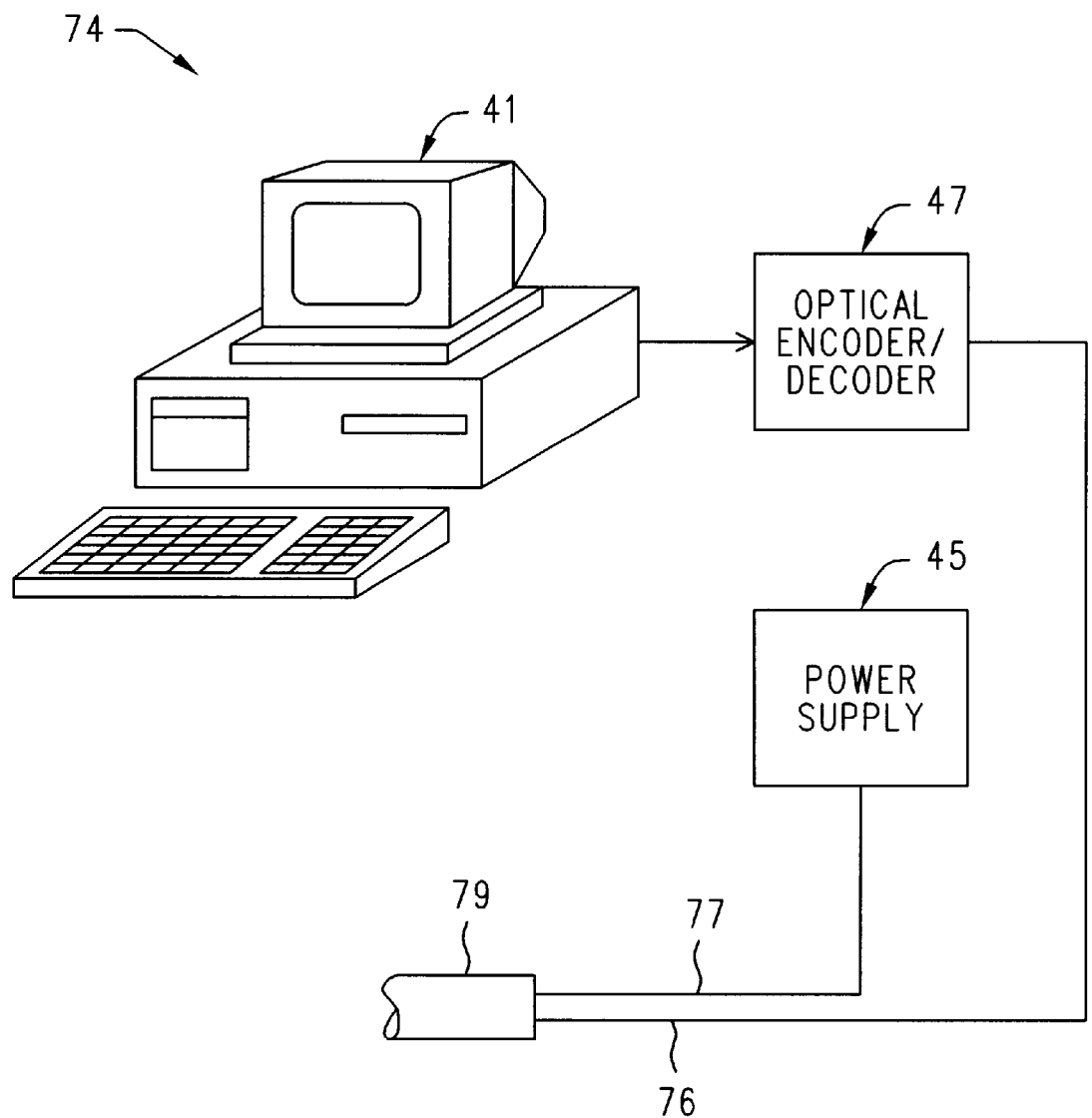
FIG. 17 is a block diagram of the control system used to control the operation of the pipe crawler.

The pipe crawler 10 may be controlled from a remote location by a control system 74, as best seen in FIG. 17. In one preferred embodiment, the control system 74 may be connected to the pipe crawler 10 by a tether 79 that comprises fiber optic and electrical cables 76 and 77. The tether 79 is payed-out from a tether reel 78 mounted to the pipe crawler 10. See FIGS. 1, 2, and 16. Data signals for controlling the pipe crawler 10 and for receiving data from the various sensors and/or video camera and light assembly 98 may be transferred via the fiber optic cable 76. Electrical power for the various drive motor assemblies, e.g., 58, 60, and 62, the steering actuator 40, the optional video camera and light assembly 98, and the various sensors (not shown) carried within the payload pods 18 and 20 may be supplied by the control system 74 to the pipe crawler 10 via the electrical cables 77 carried alongside the fiber optic cable 76.

During operation, the pipe crawler 10 may be actuated by the control system 74 to move axially down the pipe 12 in the direction indicated by arrow 80. See FIG. 1. In order to move along the pipe, the control system 74 will actuate the steering actuator 40 as necessary to ensure that the various drive wheel assemblies, e.g., 22, 24, and 26, are aligned so that their respective drive wheels 46, 50, and 52 are oriented generally parallel to the longitudinal axis 33 of the pipe 12, i.e., so that the drive wheels 46, 50, and 52, etc., are oriented in the crawling position shown in FIGS. 1 and 3. Once the drive wheels are oriented in the crawling position, the various drive motor assemblies, e.g., 58, 60, and 62 may be energized to rotate their corresponding drive wheels 48, 50, and 52 about their respective drive axes 48, 54, and 56. Depending on whether the drive wheels are driven in the forward or reverse direction, the result will be that the pipe crawler 10 will move axially along the pipe either to the left or to the right, i.e., in the direction indicated by arrows 80.

When the wheels of the various drive wheel assemblies, e.g., drive wheel assemblies 22, 24, and 26 are positioned in the crawling position, the pipe crawler 10 will be free to move axially along the pipe 12 and to follow turns oriented generally within the plane of the drive wheels when the same are in the crawling position. Therefore, if the crawler encounters an elbow joint that is substantially aligned with the plane of the drive wheels, the crawler 10 will follow the elbow, turning into the new pipe branch in the manner best seen in FIGS. 18A–E. However, if the turn (e.g., the elbow joint) is not in the plane of the drive wheels when the same are in the crawling position, then it will be necessary to first align the crawler 10 with the turn so that the tractor 10 can pass through the elbow joint.

Figure 6:
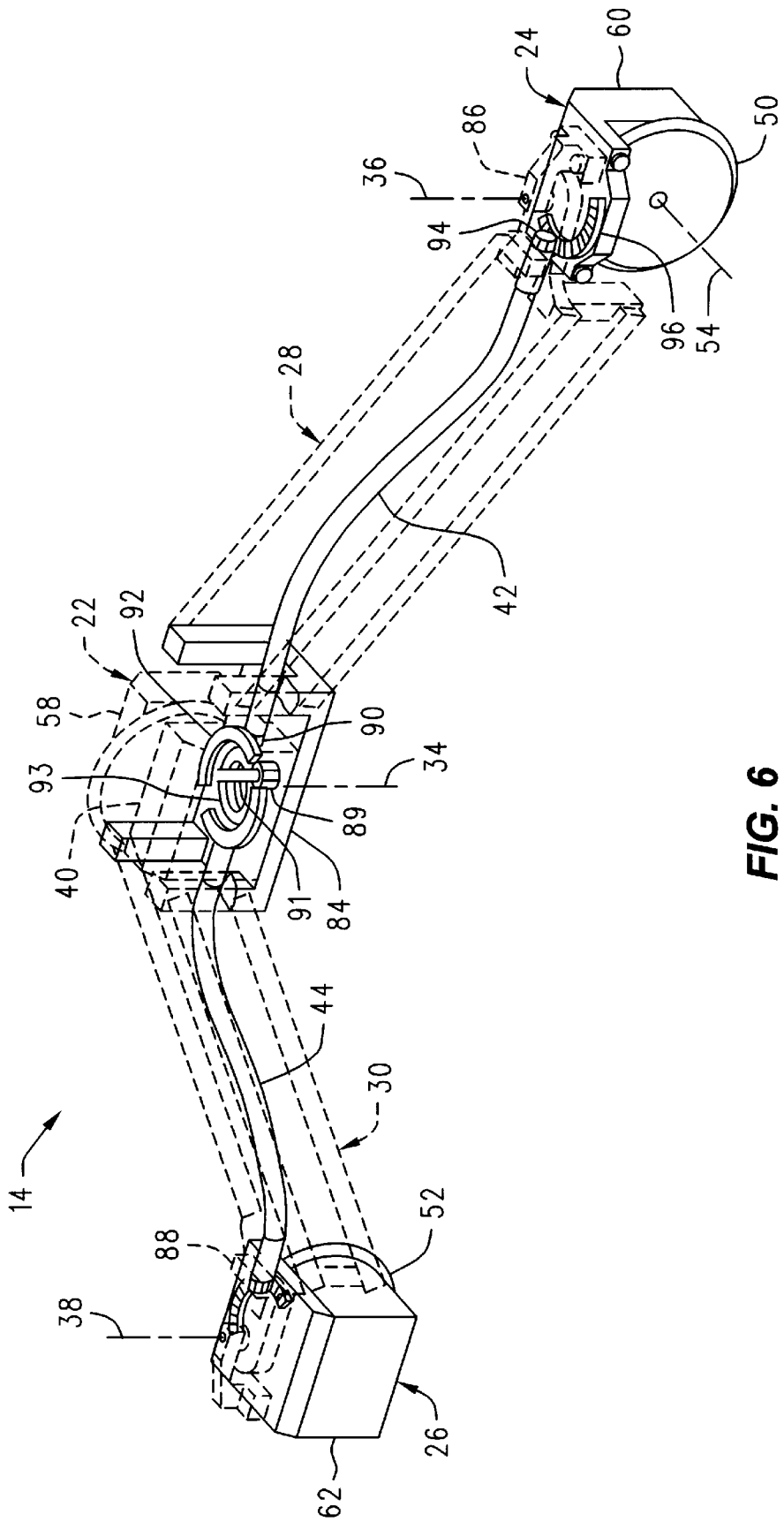
FIG. 6 is a perspective view of a half tractor assembly with the top drive wheel assembly and two flexible arms shown in dotted lines to more clearly show the details of the steering actuator and flexible drive shafts for transmitting steering torque from the top drive wheel assembly to the front and rear drive wheel assemblies.

In one preferred embodiment, such an alignment can be accomplished by first stopping the forward motion of the pipe crawler 10. Then, the control system 74 (FIG. 17) is used to energize the steering actuator 40 which rotates the top drive wheel assembly 22 about the top steering axis 34. As the top drive wheel assembly 22 rotates, the front and rear base drive wheel assemblies 24 and 26 are rotated in synchronization by the front and rear flexible drive shafts 42 and 44 (FIG. 6). Once the various drive wheel assemblies have been rotated to the steering position (FIG. 2), the various drive motor assemblies 58, 60, and 62 can be energized to cause the entire crawler 10 to rotate within the pipe 12 in the direction indicated by arrow 82. See FIG. 4. Once the crawler 10 is aligned with the elbow, the drive wheel assemblies may then be rotated back to the crawling position and the crawler advanced through the turn. See FIGS. 18A–E.

The foregoing process can also be used to direct the crawler 10 through tee joints and other similar fittings (not shown) that may comprise the piping system. For example, if it is desired to direct the crawler 10 straight through a tee joint, then the drive wheels and flexible arms e.g., 28, 30 must not be aligned with the leg branch of the tee. Conversely, if it is desired to turn the crawler 10 into the leg branch of the tee fitting, then the crawler 10 must first be steered to align it with the leg branch, as was the case for the elbow joint. The drive wheel assemblies 22, 24, and 26 may then be then rotated back to the crawling position whereupon the crawler will be directed through the turn. See FIGS. 18A–E.

A significant advantage of the pipe crawler tractor 10 according to the present invention is that its small size allows it to traverse pipes having relatively small diameters, typically in the range of about 1 to 3 inches. The spring biased flexible arms 28, 30 connecting the top drive wheel assembly 22 to the front and rear base drive wheel assemblies 24 and 26 urge the drive wheels (e.g., 46, 50, and 52) firmly against the inside wall 32 of the pipe 12, thus allowing the wheels to develop sufficient tractive force to move the pipe crawler tractor 10 through the pipe 12 and up and down vertical sections of the pipe 12 without slipping. The spring biased flexible arms 28, 30 also allow the pipe crawler tractor 10 to expand and contract radially to accommodate different pipe diameters, such as may occur with reducing or expanding joints (not shown) that may be associated with the piping system. Of course, the spring biased flexible arms 28 and 30 also allow the pipe crawler 10 to turn corners, such as are associated with elbow or tee joints in the manner already described and shown in FIGS. 18A–E.

The ability to rotate the top, front base, and rear base drive wheel assemblies 22, 24, and 26 about their respective steering axes 34, 36, and 38 allows the pipe crawler tractor 10 to be positioned in any desired radial position within the pipe 12. See FIG. 4. By properly radially aligning the pipe crawler tractor 10 within the pipe 12, the tractor 10 may be aligned to select any desired branch contained within the piping system, such as may be associated with a tee joint. That is, if the tractor is aligned so that the plane of the drive wheels when in the crawling position and, consequently, the flexible arms 28 and 30, are in the plane of the desired turn through the tee joint, the pipe crawler tractor 10 will take the turn. Conversely, if the plane of the drive wheels is not so aligned (e.g., perpendicular) to the plane of the desired turn, then the tractor 10 will not take the turn, but instead will pass straight through the tee joint.

Still other advantages are associated with the pipe crawler tractor 10. For example, since each half tractor assembly 14, 16 is identical, any number of half tractor assemblies may be linked together to provide the desired degree of payload capacity or tractive force required to safely traverse the piping system. Likewise, the modular design of the payload pods 18, 20 will allow any number of pods to be hauled into the piping system by linking them between a corresponding number of half tractor assemblies.

The tether reel assembly 78 mounted to the trailing half tractor 16 provides a convenient means for paying-out the tether 79 comprising the fiber optic and power cables 76 and 77 that connect the pipe crawler tractor 10 to the control system 74.

Finally, the control system 74 which, in one preferred embodiment, is based on a PC-type of computer 41, may be programmed to accommodate a wide variety of piping systems or desired uses, thus allowing a single pipe crawler 10 to be adapted to any of a wide range of missions. The computer 41 also provides a convenient means for displaying the video image received from the video camera and light assembly 98 that may be mounted to the leading drive wheel assembly, e.g., front base drive wheel assembly 24.

Having briefly described the pipe crawler tractor 10 according to the present invention, as well as some of its more significant features and advantages, the pipe crawler will now be described in detail. Referring now to FIGS. 1–4 the pipe crawler tractor 10 is shown positioned inside a section of pipe 12 that is part of a larger piping system (not shown) being traversed and/or inspected by the pipe crawler tractor 10. In one preferred embodiment, the pipe crawler 10 may comprise a front half tractor assembly 14 and a rear half tractor assembly 16 connected together by a pair of payload pods 18 and 20. Since each half tractor assembly, e.g., 14, 16, and the payload pods 18, 20, are identical, the pipe crawler tractor 10 is essentially modular. That is, any number of half tractor assemblies, e.g., 14, 16, and payload pods, e.g., 18 and 20, may be connected together to configure the size and capabilities of the pipe crawler tractor 10 for nearly any situation. Generally speaking, however, two half tractor assemblies, such as front and rear half tractor assemblies 14 and 16, will be sufficient for most applications.

The front half tractor assembly 14 comprises three drive wheel assemblies 22, 24, and 26 connected together in spaced-apart relation by a pair of spring biased flexible arm assemblies 28 and 30. The arrangement is such that the top drive wheel assembly 22 is positioned substantially between the front and rear base drive wheel assemblies 24 and 26 and so that the top drive wheel 46 contacts the inside wall 32 of pipe 12 at a position substantially diametrically opposed to the positions of the two base drive wheel assemblies 24 and 26. See FIGS. 1 and 3. The substantially diametrically opposed relation of the drive wheel assemblies 22, 24, and 26 allows the spring biased arms 28, 30 to forcibly urge the drive wheels 46, 50, and 52 against the inside wall 32 of pipe 12. Consequently, the various drive wheels 46, 50, 52, etc., are able to generate sufficient tractive force to allow the pipe crawler 10 to traverse even vertical sections of the piping system without slipping.

The top drive wheel assembly 22 includes a top drive wheel 46 mounted for rotation about a top drive axis 48 (FIG. 2). Similarly, front base drive wheel assembly 24 includes a front base drive wheel 50 mounted for rotation about a front drive axis 54, and the rear base drive wheel assembly 26 includes a rear base drive wheel 52 mounted for rotation about a rear drive axis 56. In one preferred embodiment, each drive wheel, e.g., 46, 50, and 52 is independently driven by a corresponding drive motor assembly 58, 60, and 62 and can be independently actuated, as will be described in greater detail below.

Figure 5:
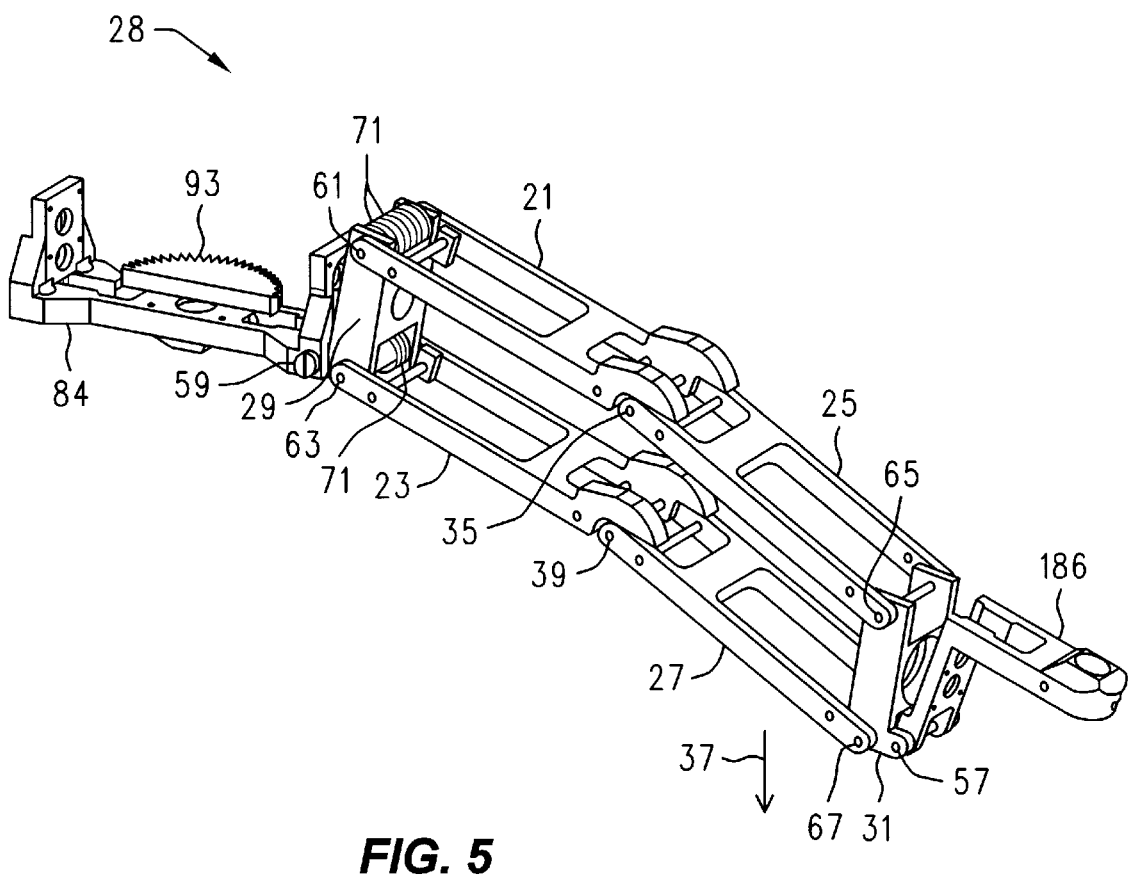
FIG. 5 is a perspective view of the front flexible arm that connects the front drive wheel assembly to the top drive wheel assembly.

The two base drive wheel assemblies, i.e., front base drive wheel assembly 24 and rear base drive wheel assembly 26, are mounted to the top drive wheel assembly 22 by a pair of spring biased flexible arms 28 and 30. Referring now to FIG. 5, spring biased flexible arm 28 comprises a plurality of linkages to allow the front drive wheel assembly 24 (not shown in FIG. 5) mounted to carrier 186 to move generally in a direction 37 with regard to the top carrier 84. Such movement allows the pipe crawler tractor 10 to negotiate turns and bends in the piping system, as was described above and as may be seen by referring to FIGS. 18A–E. Further, the links are spring biased to forcibly urge the drive wheel assemblies mounted thereto against the inside wall 32 of the pipe 12.

The spring biased flexible arm 28 comprises a pair of upper links 21, 23 and a pair of lower links 25, 27 that are pivotally connected together at joints 35 and 39, respectively. An upper end link 29 connects one pair of ends of the upper links 21, 23 at joints 61 and 63, while a lower end link 31 connects one pair of ends of the lower links 25, 27 at joints 65 and 67. The carrier 84 for the top drive wheel assembly 22 is pivotally mounted to the upper end link 29 at pivot joint 59. L-shaped carrier 186 for the front base drive wheel assembly 24 may be pivotally mounted to the lower end link 31 at pivot joint 57. Alternatively, a U-shaped carrier 86 (FIG. 14) may be connected to the lower end link 31, as will be described in greater detail below.

The flexible arm 28 is spring biased to urge the various drive wheels (e.g., 46, 50, and 52) comprising a half tractor assembly (e.g., 14) against the inside wall 32 of pipe 12. A plurality of biasing devices, such as springs 71, are associated with pivot joints 61 and 63 to urge the various links 21, 23, 25, and 27 downward in the direction of arrow 37. In one preferred embodiment, each spring 71 is identical and may comprise a conventional coil spring having a stiffness sufficient to press the various drive wheels (e.g., 46, 50, and 52) against the inside wall 32 of pipe 12 with a force necessary to provide the desired degree of traction. Optionally, similar biasing devices (e.g., springs) could be associated with the other pivot joints (e.g., 35, 39, 65 and 67) to provide additional biasing force, as may be required or desired for the particular application.

The various links comprising the spring biased flexible arm 28 may be made from any of a wide variety of metals or metal alloys, such as aluminum, titanium, or steel, suitable for the intended application. Alternatively, other materials, such as plastics or fiber reinforced plastics may be used. In one preferred embodiment, the various links comprise 6061-T6 aluminum alloy.

The top drive wheel assembly 22 is journalled in the top carrier 84 so that it can be rotated about top steering axis 34 from the crawling position (FIGS. 1 and 3) to the steering position (FIGS. 2 and 4) and back again. The steering actuator assembly 40 is used to rotate the top drive wheel assembly 22, which comprises the steering actuator assembly 40, drive motor assembly 58, and top drive wheel 46, about top steering axis 34. More specifically, steering torque from the steering actuator 40 is transmitted to the top drive wheel assembly 22 by a pinion gear 89 attached to the output shaft 91 of the steering actuator assembly 40. The pinion gear 89 engages a steering gear 93 mounted to the top carrier 84. See also FIG. 5. Thus, rotation of the drive pinion 89 will cause the entire top drive wheel assembly 22 to rotate about top steering axis 34.

Figure 7:
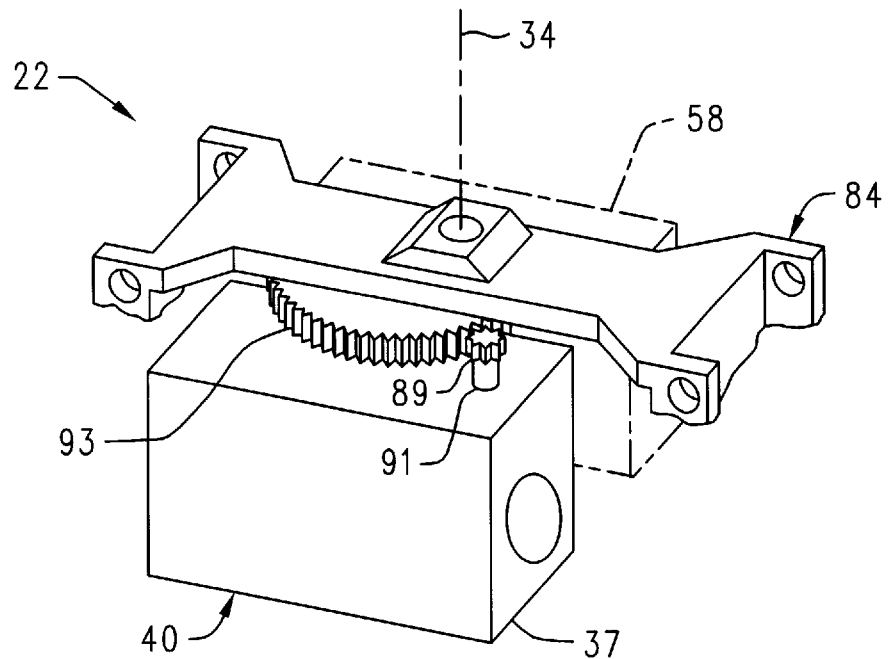
FIG. 7 is a perspective view of the top carrier in the inverted position to more clearly show the steering actuator and steering gear assembly.
Figure 8:
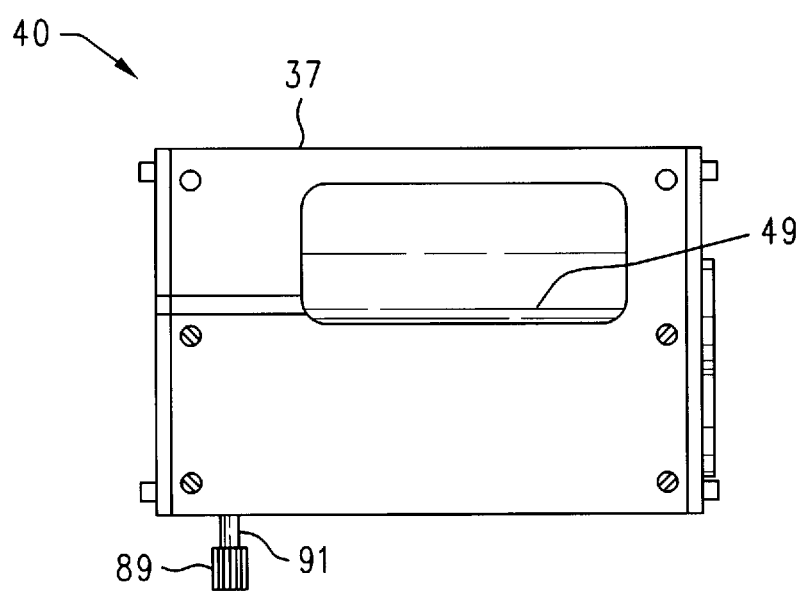
FIG. 8 is a front view in elevation of the steering actuator assembly.

Referring now to FIGS. 7 and 8, steering actuator 40 may include a housing assembly 37 adapted to receive a steering motor 49 along with a suitable reduction gear assembly (not shown) contained within the housing assembly 37. In one preferred embodiment, the steering motor 49 may comprise a conventional permanent magnet dc motor, although other types of motors could also be used. Likewise, the reduction gear assembly may comprise any of a wide variety of reduction gear assemblies suitable for providing sufficient torque to the output shaft 91 for the expected application. However, since such reduction gear assemblies are well-known and since the exact configuration of the reduction gear assembly is dependent on the speed/torque characteristics of the motor 49 as well as on the size of the housing 37, the particular reduction gear assembly used in the steering actuator 40 will not be described in further detail. It is preferred, but not required, that the output shaft 91 be oriented generally parallel to the steering axis 34 as best seen in FIG. 7.

Housing assembly 37 may also include other devices (not shown), such control circuits, limit switches, tachometers, position encoders, etc., that may be desired or required for a particular installation. However, since such devices and elements are well-known and could be easily provided by persons having ordinary skill in the art, such elements and devices will not be described in further detail. Finally, housing 37 may also include any of a wide variety of mounting devices, (e.g., tapped holes) to allow it to be mounted to the top drive motor assembly 58 in the manner shown in FIGS. 1–4 and 7 to allow the entire top drive wheel assembly 22 to rotate about the top steering axis 34 in the manner already described.

The housing 37 and the various components of the reduction gear assembly (not shown) may be fabricated from any of a wide range of materials, such as metals, metal alloys, or plastics, suitable for the intended application and as would be obvious to persons having ordinary skill in the art. In one preferred embodiment, the housing 37 is machined from a piece of 6061-T6 aluminum and the various gears (not shown) comprising the reduction gear assembly are made from a plastic material.

In accordance with one preferred embodiment of the present invention, the steering actuator assembly 40 not only provides the steering torque to rotate the top drive wheel assembly 22 about top steering axis 34, but also provides the torque required to rotate both the front and rear base drive wheel assemblies 24 and 26 about their respective steering axes 36 and 38. More specifically, the pivoting motion of the top drive wheel assembly 22 about top steering axis 34 is transmitted to the front and rear base drive wheel assemblies 24 and 26 by respective front and rear flexible drive shafts 42 and 44. In one embodiment, front and rear drive shafts 42 and 44 are connected to the various drive wheel assemblies 22, 24, and 26 by disengageable couplings, such as a "plain" disengageable coupling 73 (FIG. 9) and a locking coupling 173 (FIGS. 10–13). Alternatively, however, the flexible drive shafts may be directly connected to the drive wheel assemblies 22, 24, and 26.

Figure 9:
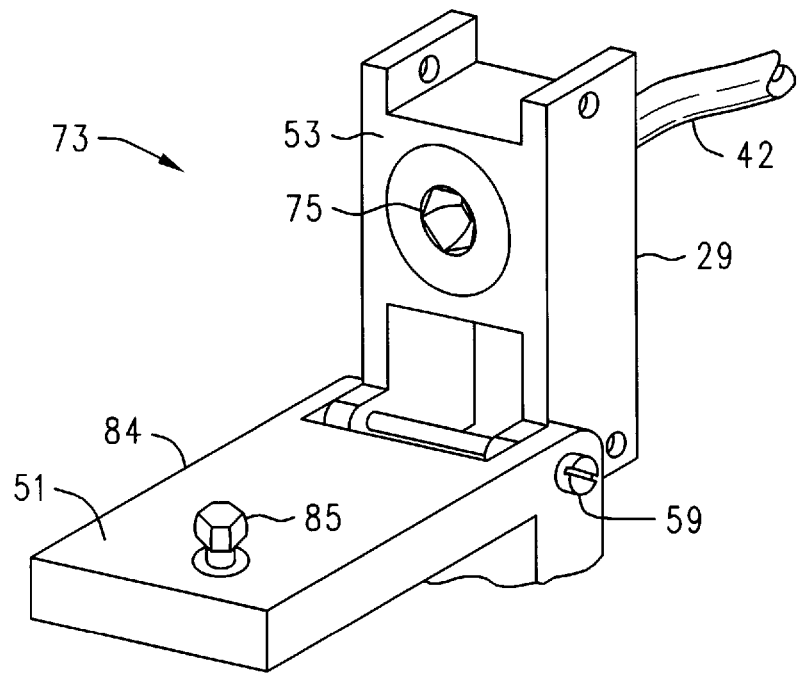
FIG. 9 is a right side perspective view of a portion of the top carrier and top end link showing the details of the disengageable hex drive ball and socket joint for transmitting steering torque to the base drive wheel assemblies.

Referring now to FIGS. 6 and 9, a first pinion gear 90 is mounted to the top carrier 84 and engages a corresponding gear sector 92 mounted to the top drive wheel assembly 22.

Figure 10:
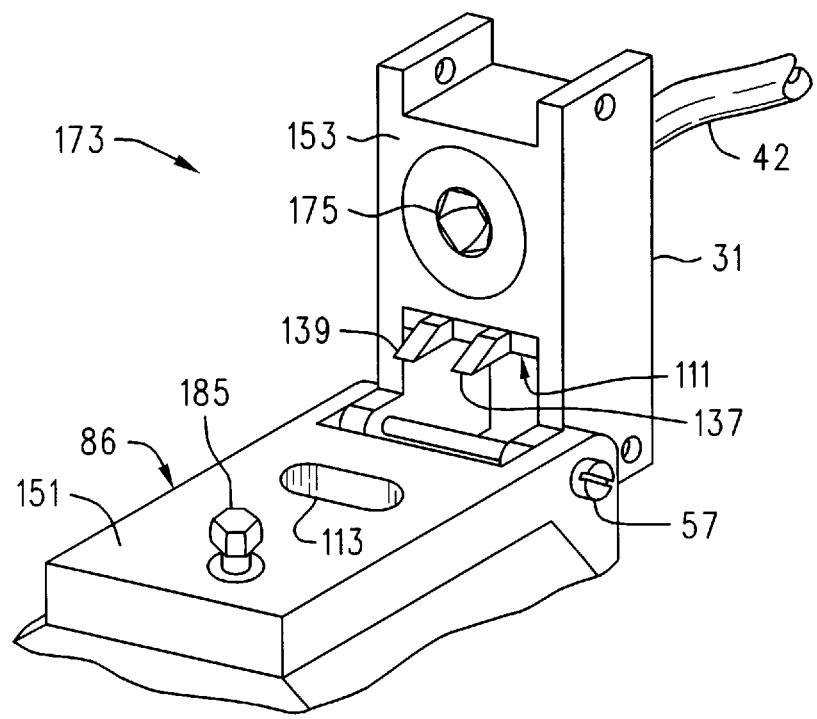
FIG. 10 is a left side perspective view of a portion of the front base drive wheel carrier and bottom end link showing the details of the disengageable hex drive ball socket joint and locking fork assembly.

A second pinion gear 94 mounted to the front carrier 86 engages a gear sector 96 mounted to the front base drive wheel assembly 24. See also FIG. 14. The front flexible drive shaft 42 is connected to the first pinion gear 90 through a "plain" disengageable coupling 73 (FIG. 9), whereas the other end of front drive shaft 42 is connected to the second pinion gear 94 by a locking disengageable coupling 173 (FIG. 10). The rear base drive wheel assembly 26 is similarly caused to pivot about rear steering axis 38 by the rear flexible drive shaft 44 which is connected to corresponding pinions by similar disengageable couplings, e.g., a plain disengageable coupling 73 at the top drive wheel assembly 22 and a locking disengageable coupling 173 at the rear base drive wheel assembly 26. However, since the arrangement of the rear flexible drive shaft 44 and couplings is essentially identical to that of the front drive shaft 42 and couplings, only the arrangement of the front drive shaft 42 and couplings 73 and 173 will be described in detail.

The plain disengageable coupling assembly 73 is used to transmit steering torque from the top drive wheel assembly 22 to the front drive shaft assembly 42. Referring now to FIG. 9, the plain coupling assembly 73 may comprise a hexagonal spherical drive socket 75 journalled in the top end link 29 of spring biased arm assembly 28. See also FIG. 5. The drive socket 75 is in turn connected to the flexible drive shaft 42. A hexagonal spherical drive ball 85 is similarly journalled in the top carrier 84 and is connected to the drive pinion 90 (FIG. 6). The drive socket 75 is adapted to receive the drive ball 85 so that when the pivoting joint 59 is closed, i.e., when the faces 51 and 53 of the top carrier 84 and end link 29 are in contact, the ball 85 and socket 75 are engaged. Therefore, when the coupling is closed, torque from the drive pinion 90 (FIG. 6) is conveyed through the coupling 73 to the flexible drive shaft 42.

The plain disengageable coupling 73 disengages whenever the pivoting joint 59 is open, i.e., in the position shown in FIG. 9. The disengagement of coupling 73 allows the pivot joint 59 to open to relatively large angles, e.g., 90° or more, allowing the pipe crawler tractor 10 to negotiate relatively sharp turns, as best seen in FIG. 18C.

The details of the locking coupling assembly 173 are best seen in FIGS. 10-13. In one preferred embodiment, the locking coupling assembly 173 may comprise a locking mechanism 87 (not shown in FIG. 10, but shown in FIGS. 11-13) incorporated into the carrier 86 of the front base drive wheel assembly 24. Alternatively, the locking mechanism may be incorporated into a separate housing (not shown) that may be attached to the carrier 86, as would be the case for the carrier 86 shown in FIG. 14. Essentially, the locking mechanism 87 locks the pinion 94 (FIG. 14) when the coupling 173 (i.e., pivot joint 57) is opened, thereby preventing the front base drive motor assembly 60 from inadvertently rotating about steering axis 36. The locking mechanism 87 unlocks when the coupling 173 is in the closed position (FIG. 13), thereby allowing steering torque from the top drive wheel assembly 22 to be transferred to the front base drive motor assembly 60, allowing it to pivot about steering axis 36 in synchronization with the top drive motor assembly 58.

Figure 11:
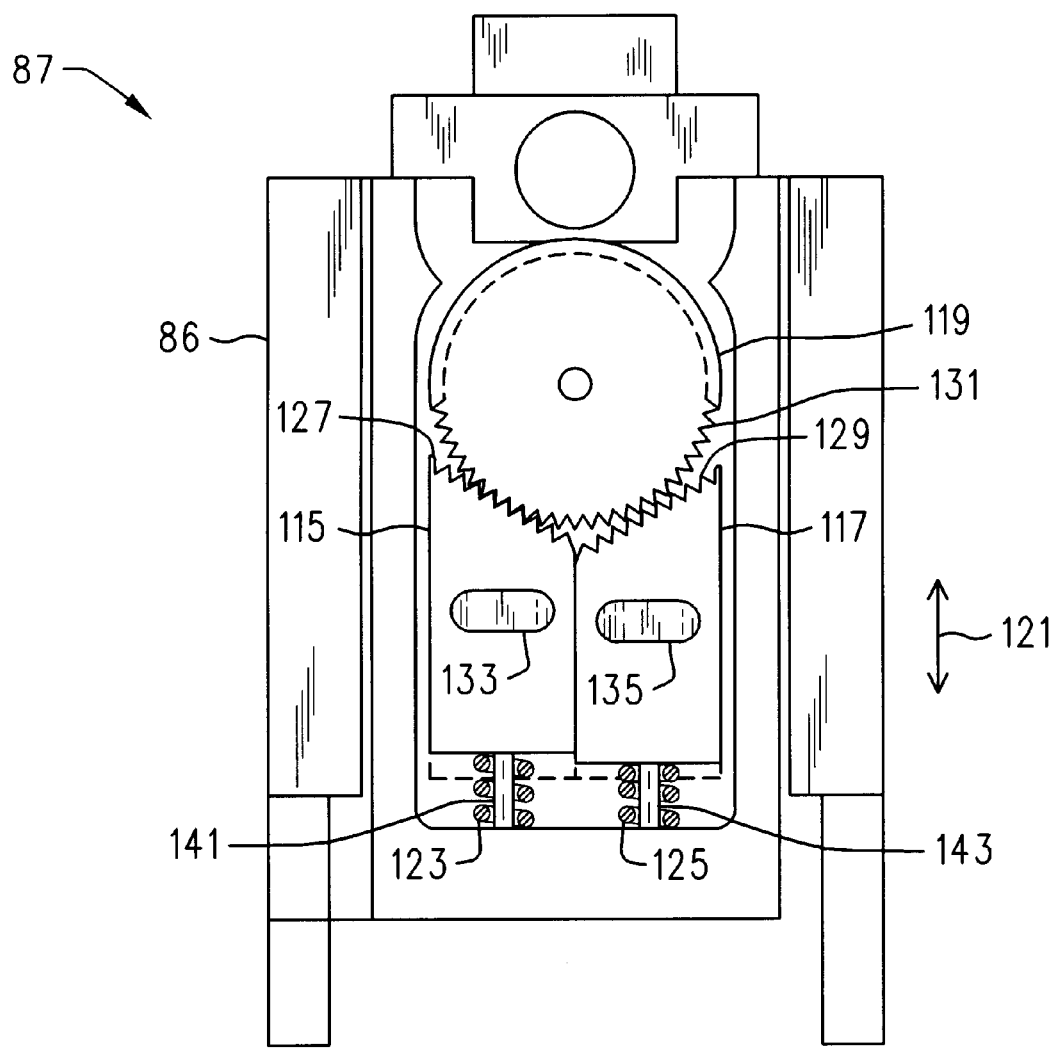
FIG. 11 is a rear view in elevation of the front base drive wheel carrier with the cover removed to show the lock wedges used to lock the steering gear when the hex drive ball socket joint is disengaged.
Figure 12:
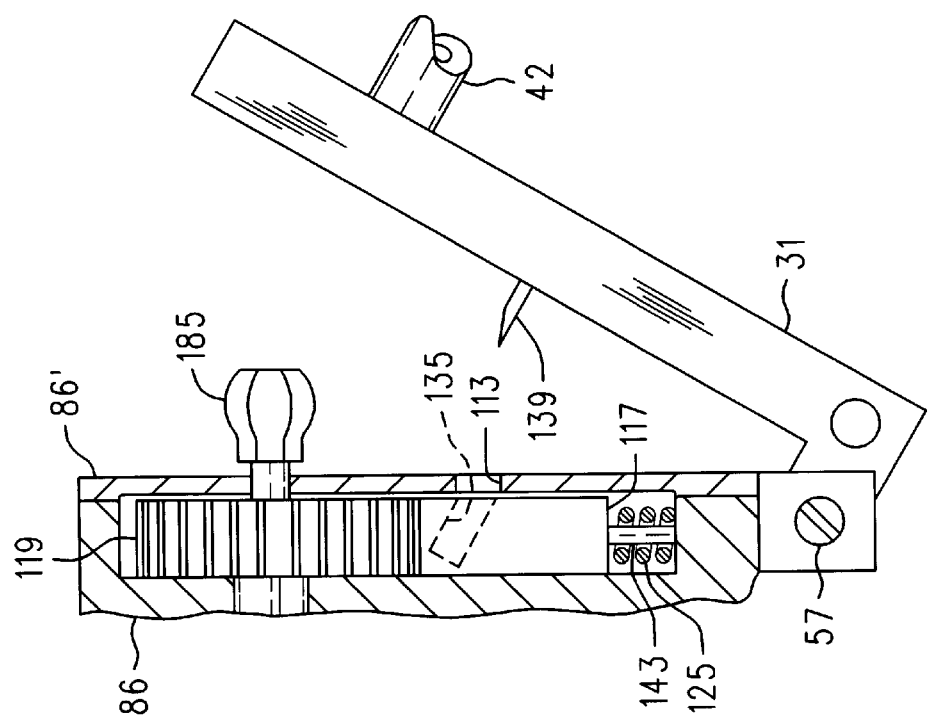
FIG. 12 is a left side view in elevation of the front base drive wheel carrier and bottom end link in the disengaged position.
Figure 14:
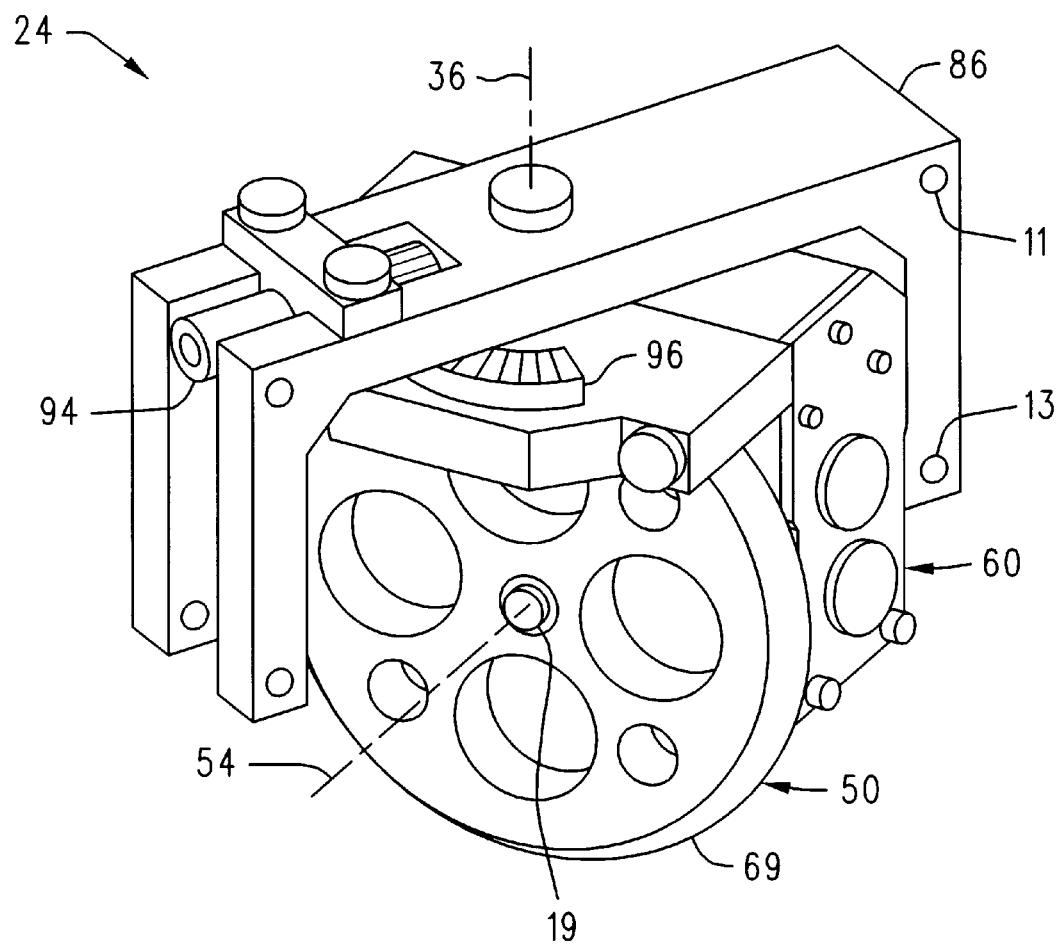
FIG. 14 is a perspective view of the front drive wheel assembly and front drive wheel carrier.

The details of the locking mechanism 87 are best seen in FIG. 11. The locking mechanism 87 comprises a pair of toothed sprags 115, 117 that are slidably mounted on a pair of pins 141, 143 within the carrier 86 so that the sprags 115, 117 can move toward and away from the steering gear 119 in the direction of arrow 121, i.e., into and out of engagement with the steering gear 119. In one preferred embodiment, the steering gear 119 is journalled in the carrier 86 and cover 86' and the drive ball 185 is mounted to one end of the steering gear 119, as best seen in FIG. 12. The other end of the steering gear 119 may be connected directly to the pinion 94 (FIG. 14). Alternatively, the steering gear 119 may be connected to pinion 94 through another gear (not shown) journalled in the carrier 86.

Each sprag 115, 117 is biased toward the steering gear 119 by a corresponding spring 123, 125. Further, each sprag 115, 117 includes a plurality of teeth 127, 129 sized and spaced to engage the teeth 131 on the steering gear 119. While the sprags 115, 117 are similar in that they are mirror images of one another, the positions of the teeth 127 on the first sprag 115 are offset slightly with respect to the positions of the corresponding teeth 129 on the second sprag 117. In one preferred embodiment, the positional offset of the teeth is about one tooth width (pitch), which allows one or the other of the two sprags 115, 117 to engage the steering gear 119 without requiring the steering gear 119 to rotate by more than about ½ the tooth pitch in either direction. The positional offset of the teeth also means that only one of the two sprags 115, 117 will be engaged with the steering gear 119 when the locking mechanism 87 is in the locked position. See FIG. 11. Of course, when one or the other of the sprags 115, 117 is engaged with the steering gear 119, it prevents the steering gear 119 from rotating, thus preventing the front base drive motor assembly 60 from rotating about the steering axis 36 (FIGS. 1-4).

Each sprag 115, 117 also includes a respective slot 133, 135, which is sized and positioned to receive a corresponding tine 137, 139 (FIG. 10) on a fork assembly 111 mounted to the lower end link 31 of the front flexible arm 28. Each slot 133, 135 is inclined within its respective sprag 115, 117, as best seen in FIG. 12, so that the tines 137, 139 on the fork assembly 111 will move both sprags 115, 117 away from the steering gear 119 when the locking coupler assembly 173 is closed, thereby disengaging the steering gear 119. See FIG. 13.

Figure 13:
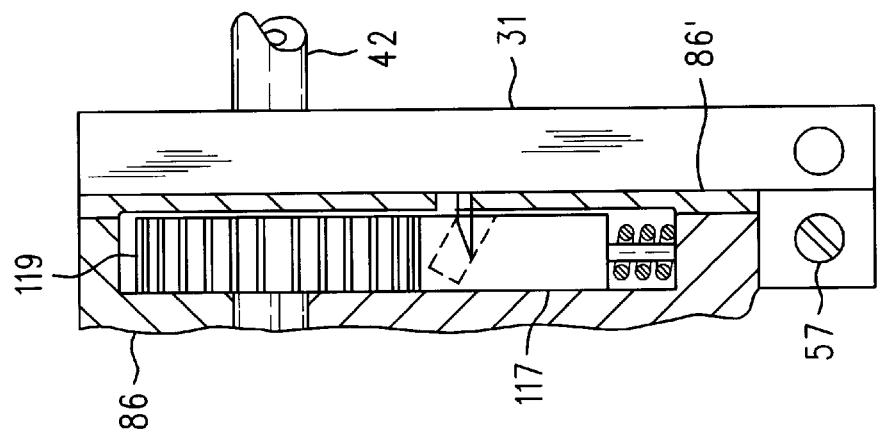
FIG. 13 is a left side view in elevation of the front base drive wheel carrier and bottom end link in the engaged position.

The operation of the locking mechanism 87 is best understood by referring to FIGS. 11, 12, and 13 simultaneously. When the coupling 173 is in the closed position (FIG. 13), the drive ball 185 and socket 175 are engaged and the locking mechanism 87 is unlocked (i.e., the sprags 115, 117 are disengaged from the steering gear 119). This configuration allows the drive shaft 42 to transmit steering torque through the coupling 173 which, of course, allows the front base drive wheel assembly 60 to rotate about steering axis 36 in synchronization with the top drive wheel assembly 58 in the manner already described. Conversely, when the coupling 173 is in the opened position (FIGS. 10-12), the ball and socket couplings 185, 175 are disengaged, and the locking mechanism 87 is engaged or locked, i.e., one of the two sprags 115, 117 is engaged with the steering gear 119, preventing it from rotating. Consequently, the pinion 94 (FIG. 14) is prevented from turning, which "locks" the front base drive motor assembly 60 and prevents it from rotating about the steering axis 36. Then, when the coupling 173 returns to the closed position (FIG. 13), the tines 137, 139 of the engagement fork 111 engage the respective inclined slots 133, 135 in the sprags 115, 117, moving them against the bias of the springs 141, 143 and disengaging them from the steering gear 119. At the same time, the ball and socket couplings 185, 175 are again engaged, thereby allowing steering torque from the drive shaft 42 to be transferred through the coupling 173 to the steering pinion 94.

The various component parts comprising the locking coupling assembly 173 may be made from any of a wide range of materials, as would be obvious to persons having ordinary skill in the art. By way of example, in one preferred embodiment the sprags 115, 117 and fork assembly 111 are made from 6061-T6 aluminum, whereas the drive ball 185 and socket 175 are made from 304 stainless steel. The steering gear 119 may be made from 17CR-4NI stainless steel, although other materials could be used as well.

Finally, and as mentioned above, a similar locking coupling assembly may be associated with the rear base drive wheel assembly 26 to prevent it from turning about its respective steering axis 38 in the manner just described. Also, in certain applications it may be desirable to replace the plain coupling assemblies, e.g., 73, associated with the top drive wheel assembly 22 with ones of the locking type, e.g., locking coupling 173, to provide additional protection against the unwanted rotation of the front and rear base drive wheels 60, 62 about their respective steering axes 36, 38.

The front base drive wheel assembly 24 is best seen in FIG. 14 and includes a drive motor assembly 60 that is journalled in carrier member 86. The arrangement is such that the drive motor assembly 60 and wheel 50 can be rotated about front steering axis 36 from the crawling position shown in FIGS. 1 and 3 to the steering position shown in FIGS. 2 and 4. Carrier 86 is also adapted to receive the locking coupling assembly 173 (FIGS. 10–13). A pinion 94 is adapted to engage the steering gear 119 mounted within the coupling assembly 173. The carrier member 86 is U-shaped and includes a pair of mounting holes 11 and 13 to allow other components, such as a spring biased flexible arm (e.g., 28, 30), a payload pod (e.g., 18, 20)), or a camera and light assembly (e.g., 98), to be mounted thereto. Alternatively, however, the invention may utilize an L-shaped carrier member 186 (FIG. 5) if it is not desired to link the carrier member 186 to a payload pod or another half tractor assembly, such as may be desired for the front or leading drive wheel assembly, e.g., 24 without a camera and light assembly 98. A gear sector 96 mounted to the drive motor assembly 60 engages pinion 94, thereby allowing the drive motor assembly 60 and drive wheel 50 to be pivoted about steering axis 36 in synchronization with the top drive wheel assembly 22.

The carrier 86 may be made from a wide range of materials, such as metals or plastics, depending on the desired application. In one preferred embodiment, the carrier 86 is made from 6061-T6 aluminum. Similarly, the various gear components, such as the pinion 94 and gear sector 96, may be made from a metal or metal alloy, such as aluminum or steel, although other materials, such as plastics, may also be used.

Figure 15:
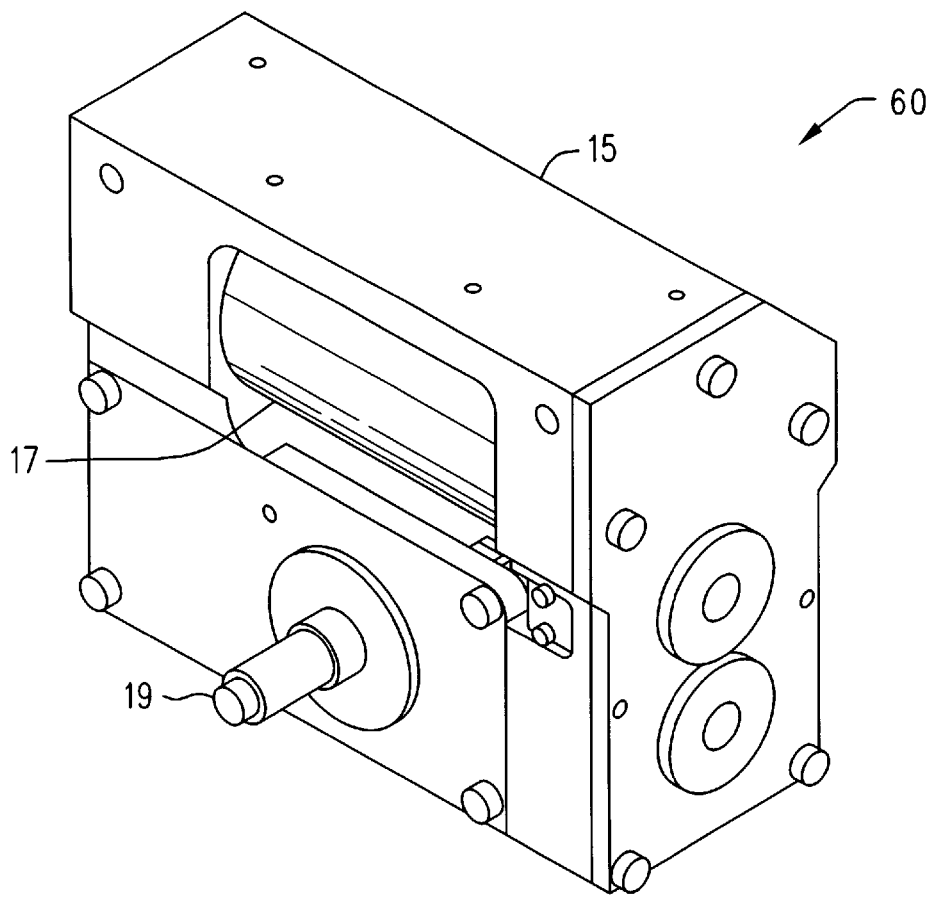
FIG. 15 is a perspective view of a drive motor assembly.

The details of the drive motor assembly 60 are best seen in FIG. 15. Essentially, the drive motor assembly 60 may comprise a housing 15 adapted to receive a motor 17 and a reduction gear assembly (not shown). In one preferred embodiment, the motor 17 may comprise a conventional permanent magnet dc motor and the reduction gear assembly (not shown) may comprise a conventional gear reduction assembly designed to provide sufficient torque to the drive wheel 50 for the expected application. Since such reduction gear assemblies are well-known and since the exact configuration of the reduction gear assembly is dependent on the speed/torque characteristics of the motor 17 as well as on the size of the housing 15, the particular reduction gear assembly used in the drive motor assembly 60 will not be described in further detail. However, for convenience in achieving the objects of the present invention, it is preferred, but not required, that the reduction gear assembly comprise a spur gear drive assembly having a reduction ratio of 125:1. Drive wheel 50 may then be mounted to the output shaft 19 by any convenient means well-known in the art for retaining wheels to shafts.

Housing 15 may also be adapted to receive other devices (not shown), such control circuits, limit switches, tachometers, position encoders, etc., that may be desired or required for a particular installation. However, since such devices and elements are well-known and could be easily provided by persons having ordinary skill in the art, such elements and devices will not be described in further detail.

As was the case for the steering actuator assembly 40, the housing 15, drive wheel 50, and the various components of the reduction gear assembly (not shown) may be fabricated from any of a wide range of materials depending on the expected application. In one preferred embodiment, the housing 15 and drive wheel 50 are made from 6061-T6 aluminum and the various gears comprising the reduction gear assembly are made from a plastic material. It is preferred, but not required, that each drive wheel, e.g., drive wheel 50, include a tire 69 to enhance its frictional engagement with the inside wall 32 of pipe 12. Tire 69 may comprise any of a wide range of materials, such as rubber or plastic, depending on the anticipated application.

Since the remaining drive motor assemblies 58 and 62 are in every way identical to the drive motor assembly 60, they will not be described in detail herein.

The pipe crawler 10 includes a tether reel assembly 78 for paying out a tether 79 comprising the fiber optic and electrical cables 76 and 77 used to connect the pipe crawler 10 to the control system 74. Referring now to FIG. 16, the tether reel assembly 78 may comprise a housing 43 adapted to receive a quantity of the tether 79. A mounting boss 83 allows the tether reel 78 to be mounted to the trailing base drive wheel assembly 66 (FIGS. 1 and 2). The tether 79 is wound in a helical coil having several layers so that the tether 79 will be steadily payed-out through fair-lead 81 as the pipe crawler advances through the pipe 12. When it comes time to retrieve the pipe crawler 10, the pipe crawler 10 can simply follow the reverse course, backtracking along the previously payed-out tether 79. Alternatively, the tether 79 can be pulled from the pipe (e.g., by an operator or a suitable device) as the pipe crawler 10 is retrieved.

The details of the control system 74 are best seen in FIG. 17. Essentially, the control system 74 is computer driven and uses a general purpose programmable computer, such as a personal computer (PC) 41, to control the function and operation of the various drive motor assemblies (e.g., 58, 60, etc.) and the steering actuator assembly 40 to allow the crawler 10 to move within the piping system. The computer 41 also collects data from the various on-board sensors (not shown) that may be appropriate for the particular pipe inspection process being performed and displays the information in a form suitable for interpretation by the user. An optical encoder/decoder assembly 47 connected between the computer 41 and the fiber optic cable 76 converts the electrical command signals from the computer 41 into optical signals suitable for transmission by the fiber optic cable 76. Of course, the pipe crawler tractor 10 also includes a suitable optical decoder assembly (not shown) for decoding the optical signals and converting them into electrical signals suitable for controlling the various devices on the pipe crawler 10. Finally, the control system 74 may also include a power supply system 45 for supplying electrical power to the pipe crawler tractor 10 via the electrical cables 77. Since such computer driven control systems are well known and could readily be provided by persons having ordinary skill in the art after having become familiar with the present invention, the computer control system 74 will not be described in further detail.

The computer control system 74 may be used to control the operation of the pipe crawler 10 and guide its passage through the piping system. When traversing straight sections of the piping system, the various drive wheel assemblies, e.g., 22, 24, and 26 will be oriented in the crawling position shown in FIG. 1 and the various drive motor assemblies, e.g., 58, 60, and 62 will be energized to turn their respective drive wheels, thus advancing the pipe crawler 10 through the piping system. If the pipe crawler 10 encounters reducer or expander joints (not shown), the pipe crawler tractor 10 will automatically expand or contract as necessary to accommodate the new pipe diameter. The operator may monitor the progress of the pipe crawler through the piping system by means of an optional video camera and light assembly 98 (FIGS. 1 and 2) mounted to the carrier 86 of the lead drive wheel assembly 24.

In the event an elbow joint is encountered, it will be necessary for the operator to ensure that the pipe crawler 10 is properly aligned with the turn before proceeding. In one embodiment, this may be accomplished by monitoring the video signal received from the optional video camera and light assembly 98. Alternatively, however, other devices may be used to determine the orientation of the pipe crawler 10 with respect to the pipe, as would be obvious to persons having ordinary skill in the art.

If the pipe crawler 10 is not properly aligned with the elbow joint, i.e., if the plane of the drive wheels (e.g., 46, 50, and 52) is not aligned with the plane of the elbow joint, the pipe crawler 10 must first be aligned with the plane of the turn. Proper rotational alignment of the pipe crawler 10 may be accomplished by stopping the pipe crawler 10 and energizing the steering actuator 40 to rotate the various drive wheel assemblies (e.g., 22, 24, and 26) from the crawling position (FIG. 1) to the steering position (FIG. 2). As was mentioned above, a single steering actuator is used to pivot all three drive wheel assemblies comprising a single half tractor assembly. For example, the steering actuator 40 pivots the top drive wheel assembly 22 about the top steering axis 34 via the drive pinion 89 and gear 93 and pivots the two base drive wheel assemblies 24 and 26 via flexible drive shaft assemblies 42 and 44. See FIG. 6.

Once all of the drive wheel assemblies (e.g., 22, 24, 26, etc.) have been pivoted to the steering position shown in FIG. 2, the control system 74 can then be used to energize the various drive motor assemblies 58, 60, 62, etc., to turn the drive wheels and rotate the pipe crawler 10 within the pipe 12 in either direction indicated by arrow 82. By monitoring the image from the video camera mounted to the pipe crawler 10, the operator can stop the rotation of the pipe crawler 10 within the pipe 12 once it is properly aligned with the turn. At this point, the drive wheel assemblies are then rotated back to the crawling position and the various drive motor assemblies 58, 60, 62, etc. actuated to advance the pipe crawler 10 through the elbow joint.

Figure 18A:
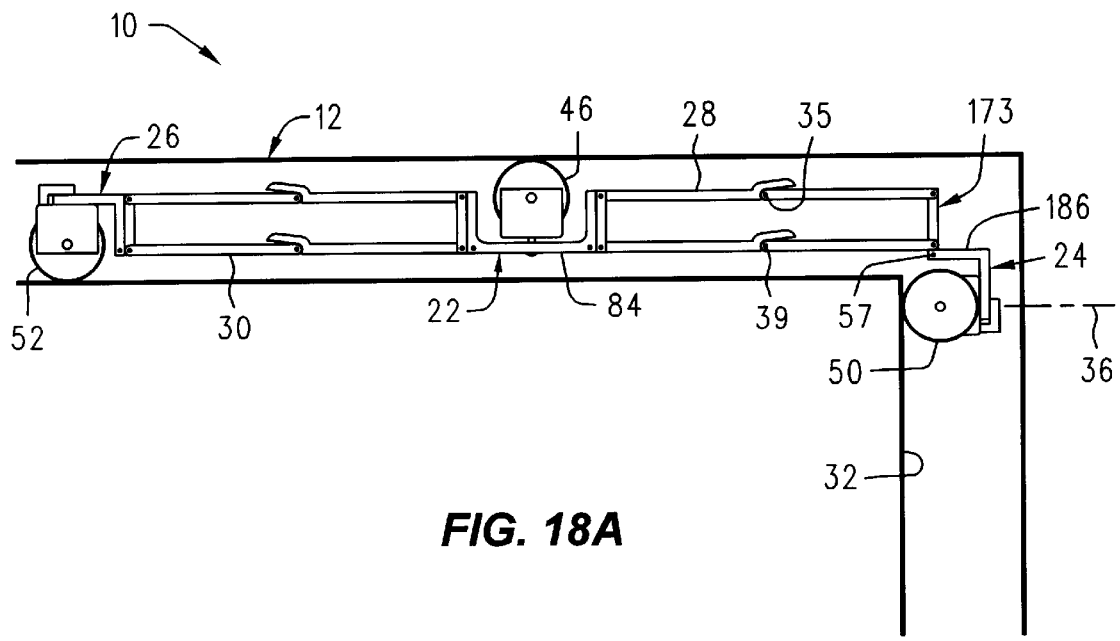
FIGS. 18(A–E) are sequential schematic views showing a half tractor assembly passing through a right angle elbow joint in the pipe.
Figure 18B:
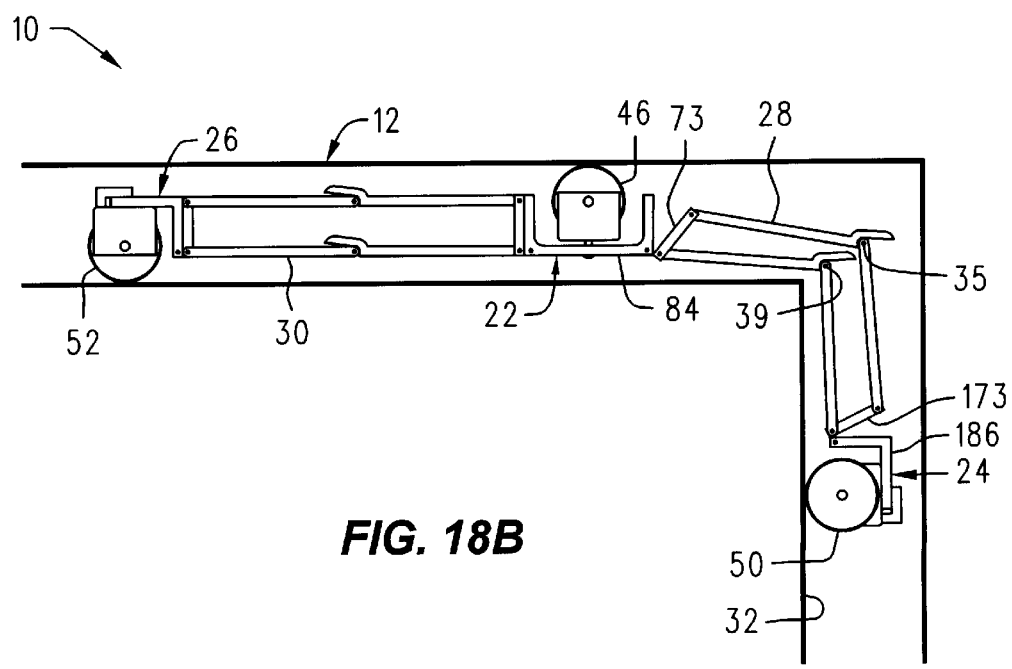
Figure 18C:
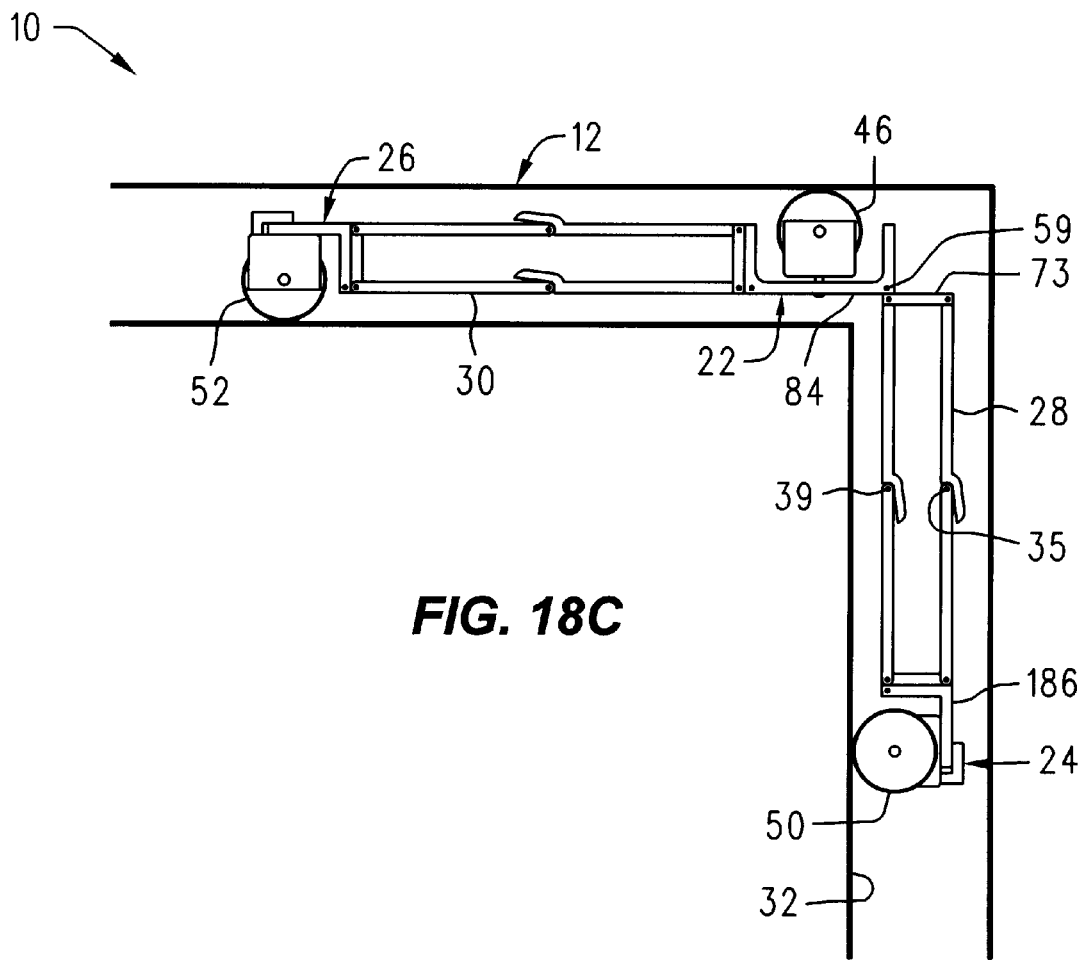
Figure 18D:
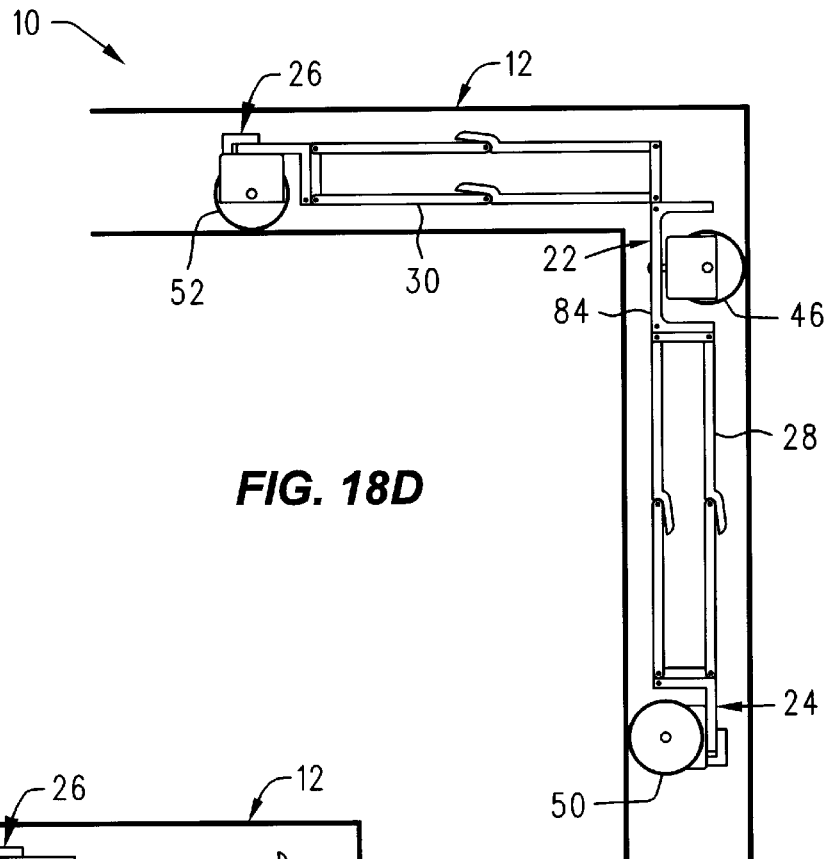
Figure 18E:
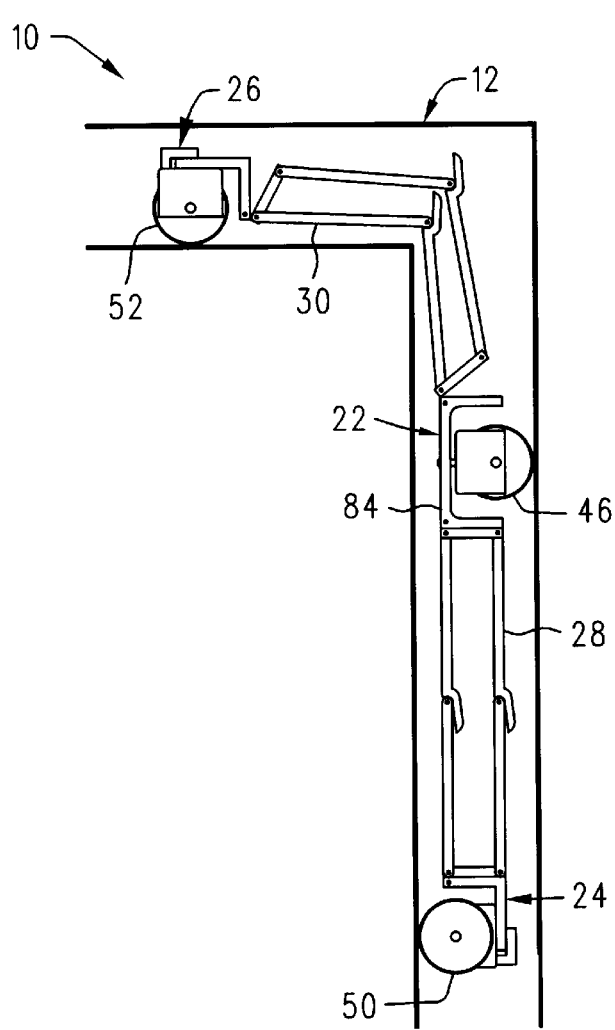

Referring now to FIG. 18A, the front carrier 186 pivots about pivot joint 57 as the pipe crawler 10 advances through the elbow joint. At this point, the locking coupler assembly 173 is opened, disengaging the drive shaft 42 (FIG. 6) from the front base drive wheel assembly 24. The locking assembly 87 associated with the coupler 173 locks the steering gear 119 (FIG. 11), thereby preventing the front base drive wheel 50 from pivoting about steering axis 36. The springs 71 (FIG. 5) associated with the flexible arm assembly 28 ensure that the front drive wheel 50 maintains contact with the inside wall 32 of the pipe 12. As the pipe crawler 10 continues to advance through the elbow joint, the first flexible arm 28 pivots about joints 35 and 39 which allows it to pass through the elbow. Again, the springs 71 associated with the flexible arm 28 allow it to maintain outward pressure on the various drive wheels 46, 50, and 52, thereby maintaining their frictional engagement with the inside wall 32 of pipe 12. See FIG. 18B.

Referring now to FIG. 18C, the pipe crawler 10 continues to advance through the elbow joint, this time with the flexible arm 28 pivoting about joint 59 connecting the spring biased flexible arm 28 to the top carrier 84. At this point, joint 59 is open, which disengages the coupling 73 (FIG. 9). The pipe crawler 10 continues to advance through the elbow joint in the manner described above with the various pivotal joints of the front and rear flexible arms 28 and 30 pivoting as necessary to allow the pipe crawler tractor 10 to pass through the joint. See FIGS. 18D and 18E.

As was described above, a similar process may be used when traversing tee joints that may be contained within the piping system being inspected or tested. If the pipe crawler tractor 10 needs to make a right angle turn through the tee joint, the procedure will be essentially identical to the procedure described above for traversing an elbow joint. That is, before traversing the joint, the pipe crawler 10 must first be aligned with the turn by pivoting the various drive wheel assemblies 22, 24, etc. to the steering position, then using the drive motors to rotate the pipe crawler 10 to the proper position. The drive wheel assemblies can then be returned to the crawling position and the pipe crawler tractor 10 advanced through the tee joint.

If, on the other hand, it is desired to drive the pipe crawler 10 straight through the tee joint, then the operator must ensure that the pipe crawler is oriented so that the drive wheels will not take the turn. Again, the same process may be used to accomplish the proper alignment and guide the pipe crawler through the desired branch.

This completes the detailed description of the various embodiments of the pipe crawler tractor 10 according to the present invention. While a number of specific components were described above for the preferred embodiments of this invention, persons having ordinary skill in the art will readily recognize that other substitute components or combinations of components may be available now or in the future to accomplish comparable functions to the various components shown and described herein. For example, while the pipe crawler tractor 10 was shown and described herein as it could be used with two half tractor assemblies 14 and 16, additional half tractor assemblies could be added to increase the payload carrying capacity or tractive ability of the pipe crawler. Similarly, additional payload pods may be included, containing whatever equipment or devices are required or desirable for a given application. Consequently, the pipe crawler tractor 10 according to the present invention should not be regarded as limited to the particular configuration of half tractor assemblies and payload pods shown and described herein.

Still other modifications are possible. For example, while one particular configuration of the drive motor assemblies was shown and described herein, persons having ordinary skill in the art will recognize that other configurations are possible and may be resorted to depending on the particular design of the pipe crawler 10 and, of course, the various components thereof.

In sum, then, it is contemplated that the inventive concepts herein described may be variously otherwise embodied and it is intended that the appended claims be construed to include alternative embodiments of the invention except insofar as limited by the prior art.

We claim:

1. A pipe crawler tractor for traversing the inside surface of a pipe, the pipe having a central axis, comprising:

a half tractor assembly having a first base drive wheel, a second base drive wheel, and a top drive wheel mounted in spaced-apart relation along said central axis so that said top drive wheel is positioned between said first and second base drive wheels and so that said first and second base drive wheels contact the inside surface of the pipe at respective first and second positions and said top drive wheel contacts the inside surface of the pipe at a third position, the third position being located at a different diametrical position from the first and second positions; and control systems operatively connected to said half tractor assembly for controlling rotation and steering of each of the first base wheel, the second base wheel, and the top drive wheel to move said half tractor assembly within the pipe.

2. The pipe crawler tractor of claim 1, wherein said first base drive wheel, said second base drive wheel, and said top drive wheel are each rotatably mounted about respective first, second, and top drive axes and wherein each of said first base drive wheel, said second base drive wheel, and said top drive wheel are also pivotally mounted about respective first, second, and top steering axes, said first, second, and top steering axes being substantially perpendicular to said first, second, and top drive axes, respectively, so that said first base drive wheel, said second base drive wheel, and said top drive wheel can be rotated from a crawling position to a steering position about said first, second, and top steering axes, respectively, the crawling position being such that said first base drive wheel, said second base drive wheel, and said top drive wheel are substantially aligned with the central axis of the pipe so that said pipe crawler tractor can move within the pipe along a direction substantially parallel to the central axis of the pipe, the steering position being such that said first base drive wheel, said second base drive wheel, and said top drive wheel are substantially perpendicular to the central axis of the pipe so that said pipe crawler tractor can be axially rotated within the pipe about the central axis of the pipe.

3. The pipe crawler tractor of claim 2 including:

steering actuator means connected to said top drive wheel for pivoting said top drive wheel about said top steering axis from the crawling position to the steering position;

first drive shaft means connected to said top drive wheel and to said first base drive wheel for pivoting said first base drive wheel about said first steering axis in response to the pivoting movement of said top drive wheel about said top steering axis; and second drive shaft means connected to said top drive wheel and to said second base drive wheel for pivoting said second base drive wheel about said second steering axis in response to the pivoting movement of said top drive wheel about said top steering axis.

4. The pipe crawler tractor of claim 3, wherein each of said first base drive wheel, said second base drive wheel, and said top drive wheel includes drive means for rotating said first base drive wheel, said second base drive wheel, and said top drive wheel about said first, second, and top drive axes, respectively.

5. The pipe crawler tractor of claim 4, wherein said control system includes communication link means for transmitting control signals from said control system to said half tractor assembly.

6. The pipe crawler tractor of claim 5, wherein said communication link means comprises a fiber optic cable tether and wherein said half tractor includes tether reel means for paying out said fiber optic cable as said half tractor moves within said pipe.

7. A pipe crawler tractor for traversing the inside surface of a pipe, the pipe having a central axis, comprising:

a first base drive wheel assembly having a first drive wheel mounted for rotation about a first drive axis;

a second base drive wheel assembly having a second drive wheel mounted for rotation about a second drive axis;

a top drive wheel assembly having a top drive wheel mounted for rotation about a top drive axis;

a first flexible arm connecting said first base drive wheel assembly to said top drive wheel assembly;

a second flexible arm connecting said top drive wheel assembly to said second base drive wheel assembly, wherein said first and second flexible arms hold said first drive wheel, said second drive wheel, and said top drive wheel in spaced-apart relation along the central axis of the pipe so that said first and second drive wheels contact the inside surface of the pipe at respective first and second positions and so that said top drive wheel contacts the inside surface of the pipe at a third position, the third position being located at a different diametrical position from the first and second positions; and a control system operatively connected to said pipe crawler tractor for controlling the rotation of the first, second, and top drive wheels.

8. The pipe crawler tractor of claim 7, wherein said first base drive wheel assembly, said second base drive wheel assembly, and said top drive wheel assembly each includes a motor connected to said first drive wheel, said second drive wheel, and said top drive wheel, respectively, for turning said first drive wheel, said second drive wheel, and said top drive wheel, respectively, in a forward direction and a reverse direction about said respective first, second, and top drive axes.

9. The pipe crawler tractor of claim 8, wherein said first base drive wheel assembly, said second base drive wheel assembly, and said top drive wheel assembly are pivotally mounted about respective first, second, and top steering axes, said first, second, and top steering axes being substantially perpendicular to said first, second, and top drive axes, respectively, so that said first drive wheel, said second drive wheel, and said top drive wheel can be rotated about said first, second, and top steering axes, respectively, from a crawling position to a steering position, the crawling position being such that said first drive wheel, said second drive wheel, and said top drive wheel are substantially aligned with the central axis of the pipe so that said pipe crawler tractor can move within the pipe along a direction substantially parallel to the central axis of the pipe, the steering position being such that said first drive wheel, said second drive wheel, and said top drive wheel are substantially perpendicular to the central axis of the pipe so that said pipe crawler tractor can be axially rotated within the pipe about the central axis of the pipe.

10. The pipe crawler tractor of claim 9 including:

steering actuator means connected to said top drive wheel assembly for pivoting said top drive wheel assembly about said top steering axis from the crawling position to the rotation position;

first drive shaft means connected to said top drive wheel assembly and to said first base drive wheel assembly for pivoting said first base drive wheel assembly about said first steering axis in response to the pivoting movement of said top drive wheel assembly about said top steering axis; and second drive shaft means connected to said top drive wheel assembly and to said second base drive wheel assembly for pivoting said second base drive wheel assembly about said second steering axis in response to the pivoting movement of said top drive wheel assembly about said top steering axis.

11. The pipe crawler tractor of claim 10, wherein said control system includes communication link means for transmitting control signals from said control system to said pipe crawler tractor.

12. The pipe crawler tractor of claim 11, wherein said communication link means comprises a fiber optic cable tether and wherein said pipe crawler tractor includes tether reel means for paying out said fiber optic cable as said pipe crawler tractor moves within said pipe.

13. The pipe crawler tractor of claim 7, wherein said first and second flexible arms each comprise a plurality of links pivotally connected together along various ones of a plurality of link pivot axes, each of said plurality of links also including biasing means for urging each of said plurality of links to pivot about respective ones of said plurality of link pivot axes so that said biasing means cause said first and second flexible arms to urge said first base drive wheel assembly, said second base drive wheel assembly, and said top drive wheel assembly against the inside surface of the pipe.

14. A pipe crawler tractor for traversing the inside surface of a pipe, the pipe having a central axis, comprising:

a first base drive wheel;

a second base drive wheel;

a top drive wheel;

a first flexible arm connecting said first base drive wheel to said top drive wheel; and a second flexible arm connecting said top drive wheel to said second base drive wheel, wherein said first and second flexible arms hold said first base drive wheel, said second base drive wheel, and said top drive wheel in spaced-apart relation along the central axis of the pipe so that said first and second base drive wheels contact the inside surface of the pipe at respective first and second positions and so that said top drive wheel contacts the inside surface of the pipe at a third position, the third position being located at a different diametrical position from the first and second positions.

15. The pipe crawler tractor of claim 14, wherein said first and second positions are both substantially located along a base wheel line that is substantially parallel to the central axis of the pipe.

16. The pipe crawler tractor of claim 15, wherein said first and second flexible arms are biased to urge the first, second, and top drive wheels against the inside surface of the pipe.

17. The pipe crawler tractor of claim 16, wherein said first base drive wheel, said second base drive wheel, and said top drive wheel are each rotatably mounted about respective first, second, and top drive axes and wherein each of said first base drive wheel, said second base drive wheel, and said top drive wheel are also pivotally mounted about respective first, second, and top steering axes, said first, second, and top drive axes being substantially perpendicular to said first, second, and top steering axes, respectively, so that said first base drive wheel, said second base drive wheel, and said top drive wheel can be rotated from a crawling position to a steering position about said first, second, and top steering axes, respectively, the crawling position being such that said first base drive wheel, said second base drive wheel, and said top drive wheel are substantially aligned with the central axis of the pipe so that said pipe crawler tractor can move within the pipe along a direction substantially parallel to the central axis of the pipe, the steering position being such that said first base drive wheel, said second base drive wheel, and said top drive wheel are substantially perpendicular to the central axis of the pipe so that said pipe crawler tractor can be axially rotated within the pipe about the central axis of the pipe.

18. The pipe crawler tractor of claim 17 including:

steering actuator means connected to said top drive wheel for pivoting said top drive wheel about said top steering axis from the crawling position to the steering position;

first drive shaft means connected to said top drive wheel and to said first base drive wheel for pivoting said first base drive wheel about said first steering axis in response to the pivoting movement of said top drive wheel about said top steering axis; and second drive shaft means connected to said top drive wheel and to said second base drive wheel for pivoting said second base drive wheel about said second steering axis in response to the pivoting movement of said top drive wheel about said top steering axis.

19. The pipe crawler tractor of claim 18, wherein each of said first base drive wheel, said second base drive wheel, and said top drive wheel includes drive means for rotating said first base drive wheel, said second base drive wheel, and said top drive wheel about said first, second, and top drive axes, respectively.

20. The pipe crawler tractor of claim 14, further comprising:

a control system located at a remote position from said pipe crawler tractor for controlling said pipe crawler tractor; and communication link means for transmitting control signals from said control system to said pipe crawler tractor.

21. The pipe crawler tractor of claim 20, wherein said communication link means comprises a fiber optic cable tether and wherein said pipe crawler tractor includes tether reel means for paying out said fiber optic cable as said pipe crawler tractor moves within said pipe.

22. The pipe crawler tractor of claim 14, wherein said first and second flexible arms each comprise a plurality of links pivotally connected together along various ones of a plurality of link pivot axes, each of said plurality of links also including biasing means for urging each of said plurality of links to pivot about respective ones of said plurality of link pivot axes so that said biasing means cause said first and second flexible arms to urge said first base drive wheel, said second base drive wheel, and said top drive wheel against the inside surface of the pipe.

23. A pipe crawler tractor for traversing the inside surface of a pipe, the pipe having a central axis, comprising:

a first base drive wheel assembly having a first drive wheel mounted for rotation about a first drive axis, said first drive wheel also being pivotally mounted about a first steering axis that is substantially perpendicular to the first drive axis, said first base drive wheel assembly also including a first motor for turning the first base wheel about the first drive axis;

a second base drive wheel assembly having a second drive wheel mounted for rotation about a second drive axis, said second drive wheel also being pivotally mounted about a second steering axis that is substantially perpendicular to the second drive axis, said second base drive wheel assembly also including a second motor for turning the second base drive wheel about the second drive axis;

a top drive wheel assembly having a top drive wheel mounted for rotation about a top drive axis, said top drive wheel also being pivotally mounted about a top steering axis that is substantially perpendicular to the top drive axis, said top drive wheel assembly also including a top motor for turning the top drive wheel about the top drive axis, said top drive wheel assembly also including a steering actuator for pivoting said top drive wheel assembly about said top steering axis;

a first flexible arm connecting said first base drive wheel assembly to said top drive wheel assembly;

a second flexible arm connecting said top drive wheel assembly to said second base drive wheel assembly, wherein said first and second flexible arms hold said first drive wheel, said second drive wheel, and said top drive wheel in spaced-apart relation along the central axis of the pipe so that said first and second drive wheels contact the inside surface of the pipe at respective first and second positions and so that said top drive wheel contacts the inside surface of the pipe at a third position, the third position being located at a different diametrical position from the first and second positions;

a first drive shaft connected to said top drive wheel assembly and to said first base drive wheel assembly for pivoting said first base drive wheel about said first steering axis in response to the pivoting movement of said top drive wheel about said top steering axis; and a second drive shaft connected to said top drive wheel assembly and to said second base drive wheel assembly for pivoting said second base drive wheel about said second steering axis in response to the pivoting movement of said top drive wheel about said top steering axis.

\* \* \* \* \*